US010627799B2

(12) United States Patent
Koike et al.

(10) Patent No.: US 10,627,799 B2
(45) Date of Patent: Apr. 21, 2020

(54) TERMINAL DEVICE AND TERMINAL CONTROL PROGRAM

(71) Applicant: NIDEK CO., LTD., Gamagori, Aichi (JP)

(72) Inventors: Shinji Koike, Aichi (JP); Kyoji Takeichi, Aichi (JP)

(73) Assignee: NIDEK CO., LTD., Gamagori, Aichi (JP)

( * ) Notice: Subject to any disclaimer, the term of this patent is extended or adjusted under 35 U.S.C. 154(b) by 753 days.

(21) Appl. No.: 15/278,305

(22) Filed: Sep. 28, 2016

(65) Prior Publication Data

US 2017/0090451 A1    Mar. 30, 2017

(30) Foreign Application Priority Data

Sep. 30, 2015 (JP) ................................. 2015-192671
Sep. 30, 2015 (JP) ................................. 2015-192672
Sep. 30, 2015 (JP) ................................. 2015-192673

(51) Int. Cl.
*G05B 19/18* (2006.01)
*G05B 19/409* (2006.01)

(52) U.S. Cl.
CPC ......... *G05B 19/182* (2013.01); *G05B 19/409* (2013.01); *G05B 2219/33098* (2013.01);
(Continued)

(58) Field of Classification Search
CPC ................ G05B 19/182; G05B 19/409; G05B 2219/33098; G05B 2219/34344;
(Continued)

(56) References Cited

U.S. PATENT DOCUMENTS 8,235,770 B2 * 8/2012 Obayashi ................ B24B 9/148
451/43
10,459,675 B2 * 10/2019 Hashem ................ G06F 3/1423
(Continued)

FOREIGN PATENT DOCUMENTS

DE    102014103422 A1    9/2014
EP         1400882 A2    3/2004
(Continued)

OTHER PUBLICATIONS

Search Report dated Mar. 24, 2017 issued by the European Patent Office in counterpart European Patent Application No. 16191342.1.
(Continued)

*Primary Examiner* — Abdelmoniem I Elamin
(74) *Attorney, Agent, or Firm* — Sughrue Mion, PLLC

(57) ABSTRACT

A terminal device for assisting operation of a plurality of eyeglass manufacturing apparatuses which are used for performing different processes in manufacturing eyeglasses includes: a communicating device configured to communicate with the plurality of eyeglass manufacturing apparatuses; a processor; and memory storing computer readable instructions, when executed by the processor, causing the terminal device to execute: a setting instruction for setting, according to a process, a specific eyeglass manufacturing apparatus from the plurality of eyeglass manufacturing apparatuses as an eyeglass manufacturing apparatus of which the operation is assisted; and a controlling instruction for controlling the communicating device to send an operating signal input in the terminal device to the specific eyeglass manufacturing apparatus set by the setting instruction or controlling the communicating device to receive an input signal input in the specific eyeglass manufacturing apparatus set by the setting instruction.

13 Claims, 8 Drawing Sheets

(52) U.S. Cl.
CPC .............. *G05B 2219/34344* (2013.01); *G05B 2219/35488* (2013.01); *G05B 2219/36142* (2013.01); *G05B 2219/36164* (2013.01); *G05B 2219/36168* (2013.01); *G05B 2219/45175* (2013.01); *G05B 2219/50132* (2013.01)

(58) Field of Classification Search
CPC ........... G05B 2219/35488; G05B 2219/36142; G05B 2219/36164; G05B 2219/36168; G05B 2219/45175; G05B 2219/50132; Y02P 90/06
See application file for complete search history.

(56) References Cited

U.S. PATENT DOCUMENTS

| | | |
|---|---|---|
| 2004/0059434 A1 | 3/2004 | Reimann |
| 2012/0123565 A1 | 5/2012 | Buckenmaier et al. |
| 2013/0132898 A1* | 5/2013 | Cuento ................. G06F 3/0482 715/810 |
| 2013/0236585 A1 | 9/2013 | Shibata et al. |
| 2014/0228995 A1 | 8/2014 | Tanaka et al. |
| 2014/0250153 A1 | 9/2014 | Nixon et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0302749 A1 | 10/2014 | Samukawa et al. |
| 2015/0045916 A1* | 2/2015 | Yokomae .............. G05B 19/409 700/83 |
| 2015/0220080 A1 | 8/2015 | Nixon et al. |
| 2015/0261215 A1 | 9/2015 | Blevins et al. |
| 2015/0290762 A1* | 10/2015 | Suzue ..................... B24B 9/148 451/5 |
| 2016/0043866 A1 | 2/2016 | Nixon et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0103103 A1 | 4/2017 | Nixon et al. |
| 2017/0115648 A1 | 4/2017 | Nixon et al. |
| 2017/0199843 A1 | 7/2017 | Nixon et al. |
| 2017/0235298 A1 | 8/2017 | Nixon et al. |
| 2018/0239173 A1* | 8/2018 | Cuento ................. G06F 3/0482 |

FOREIGN PATENT DOCUMENTS

| | | |
|---|---|---|
| EP | 2453327 A2 | 5/2012 |
| JP | 2013-30641 A | 2/2013 |
| JP | 2013-212573 A | 10/2013 |
| JP | 2014-151398 A | 8/2014 |
| JP | 2014-224799 A | 12/2014 |
| WO | 2013/085010 A1 | 6/2013 |
| WO | 2014/073465 A1 | 5/2014 |

OTHER PUBLICATIONS

Communication dated Jul. 31, 2019, issued by the Japanese Patent Office in counterpart Japanese Application No. 2015-192671.
Communication dated Jul. 31, 2019, issued by the Japanese Patent Office in counterpart Japanese Application No. 2015-192672.
Communication dated Jul. 31, 2019, issued by the Japanese Patent Office in counterpart Japanese Application No. 2015-192673.

* cited by examiner

TERMINAL DEVICE AND TERMINAL CONTROL PROGRAM

CROSS REFERENCE TO RELATED APPLICATION

This application is based upon and claims the benefit of priorities of Japanese Patent Application No. 2015-192671 filed on Sep. 30, 2015, Japanese Patent Application No. 2015-192672 filed on Sep. 30, 2015, and Japanese Patent Application No. 2015-192673 filed on Sep. 30, 2015, the contents of which are incorporated herein by reference in its entirety.

BACKGROUND

The present invention relates to a terminal device and a terminal control program in order to assist operation of a plurality of eyeglass manufacturing apparatuses used for manufacturing eyeglasses.

Known eyeglass manufacturing apparatuses used in each work process for manufacturing eyeglasses include an optometric apparatus that measures the visual function of both eyes of an examinee, a lensmeter that measures an optical characteristic of an eyeglass lens, a cup attaching apparatus for attaching a cup which is a work jig to the surface of an eyeglass lens, a lens processing apparatus that includes a processing tool to process the periphery of an eyeglass lens held on a lens chuck shaft, and the like (for example, refer to JP-A-2013-212573).

Such eyeglass manufacturing apparatuses are generally operated by using an operating unit disposed for each eyeglass manufacturing apparatus in the related art.

SUMMARY

In such eyeglass manufacturing apparatuses, each eyeglass manufacturing apparatus is required to be operated until eyeglasses are manufactured, and an operator has to move to the positions of the plurality of eyeglass manufacturing apparatuses and operate the operating unit of each eyeglass manufacturing apparatus, and thereby effort and time are required.

The present disclosure is conceived in view of the problem in the related art and a technical object thereof is the provision of a terminal device and a terminal control program that can facilitate manufacturing of eyeglasses.

The present disclosure is characterized by including a configuration described below in order to resolve the problem.

A terminal device for assisting operation of a plurality of eyeglass manufacturing apparatuses which are used for performing different processes in manufacturing eyeglasses, the terminal device comprising:

communicating means for communicating with the plurality of eyeglass manufacturing apparatuses;

setting means for setting, according to a process, a specific eyeglass manufacturing apparatus from the plurality of eyeglass manufacturing apparatuses as an eyeglass manufacturing apparatus of which the operation is assisted; and control means for controlling the communicating means to send an operating signal input in the terminal device to the specific eyeglass manufacturing apparatus set by the setting means or controlling the communicating means to receive an input signal input in the specific eyeglass manufacturing apparatus set by the setting means.

A terminal device that assists operation of a plurality of eyeglass manufacturing apparatuses which is used for performing different processes in processes of manufacturing eyeglasses, the device comprising:

communicating means for communicating with the plurality of eyeglass manufacturing apparatuses;

a storage for storing a first work screen assisting an operation performed by an operator for an optometric apparatus configured to measure a visual function of both eyes of an examinee, a second work screen assisting an operation performed by the operator for a lensmeter configured to measure an optical characteristic of an eyeglass lens, a third work screen assisting an operation performed by the operator for a cup attaching apparatus for attaching a cup of a work jig to a surface of the eyeglass lens, and a fourth work screen assisting an operation performed by the operator for a lens processing apparatus which includes a processing tool processing the periphery of the eyeglass lens held in a lens chuck shaft, in an order of the first work screen, the second work screen, the third work screen, and the fourth work screen;

display control means for displaying the first work screen, the second work screen, the third work screen, and the fourth work screen in this order on a screen of a display of the terminal device;

selecting means for selecting the work screen from the first work screen, the second work screen, the third work screen, and the fourth work screen displayed by the display control means;

setting means for setting one eyeglass manufacturing apparatus from the plurality of eyeglass manufacturing apparatuses as an eyeglass manufacturing apparatus of which the operation is assisted, on the basis of the work screen selected by the selecting means; and control means for controlling the communicating means to send an operating signal for an operation performed on the work screen selected by the selecting means to the eyeglass manufacturing apparatus set by the setting means.

A terminal control method for a terminal device used for assisting operation of a plurality of eyeglass manufacturing apparatuses used for performing different processes in processes of manufacturing eyeglasses, the method comprising:

a setting step of setting one eyeglass manufacturing apparatus from the plurality of eyeglass manufacturing apparatuses as an eyeglass manufacturing apparatus of which the operation is assisted; and a control step of controlling a communicating means for communicating with the plurality of eyeglass manufacturing apparatuses to send an operating signal for an operation performed for the terminal device to the eyeglass manufacturing apparatus set by the setting step, or controlling the communicating means to receive an operating signal for an operation performed for the eyeglass manufacturing apparatus set by the setting step.

DESCRIPTION OF ILLUSTRATIVE EMBODIMENTS

Figure 1:
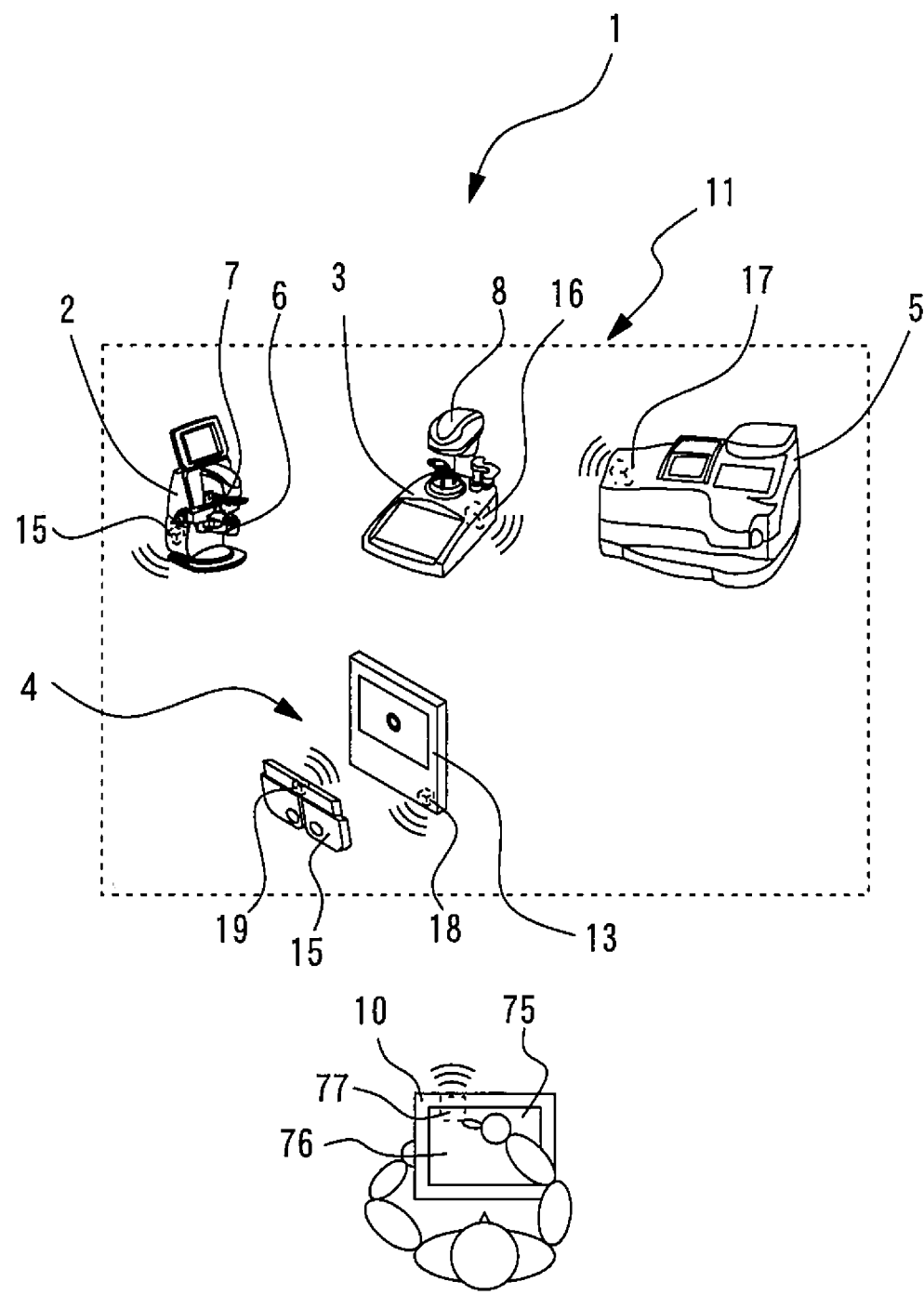
FIG. 1 is a diagram illustrating an eyeglass manufacturing system according to the present disclosure.

Hereinafter, a present embodiment will be described with reference to FIG. 1 to FIG. 10. A terminal device (for example, a terminal device 10) of the present embodiment, for example, assists operation of a plurality of eyeglass manufacturing apparatuses (for example, eyeglass manufacturing apparatuses 2 to 5 and the like) that is used in order to perform different processes in processes of manufacturing eyeglasses. A process of manufacturing eyeglasses (work process) is exemplified by an optometric process, a lens measuring process, a lens processing preparing process, and a lens processing process. A process for manufacturing eyeglasses is not limited to these processes and may be any process provided that eyeglasses can be manufactured. The process can be changed according to the function of an apparatus used.

A configuration that assists operation of a plurality of eyeglass manufacturing apparatuses is exemplified by a configuration that places a plurality of eyeglass manufacturing apparatuses into a state operable by an operator. In addition, a configuration that assists operation of a plurality of eyeglass manufacturing apparatuses is exemplified by a configuration that places a plurality of eyeglass manufacturing apparatuses into a state where the state of the plurality of eyeglass manufacturing apparatuses being operated by an operator can be checked (observed).

A plurality of eyeglass manufacturing apparatuses used in order to perform different processes in processes of manufacturing eyeglasses is exemplified by an optometric apparatus (for example, an eye refractive power measurement apparatus or a refractor), a lensmeter, a cup attaching apparatus (blocker), and a lens processing apparatus. An optometric apparatus, for example, is used when the visual function of both eyes of an examinee is measured. A lensmeter, for example, is used in order to measure an optical characteristic of an eyeglass lens. A cup attaching apparatus, for example, is used in order to attach a cup that is a work jig to the surface of an eyeglass lens. A lens processing apparatus, for example, includes a processing tool that processes the periphery of an eyeglass lens held on a lens chuck shaft. That is, a lens processing apparatus pinches an eyeglass lens on a lens chuck shaft and processes the periphery of the eyeglass lens by using the processing tool.

The terminal device in the present embodiment includes, for example, a communicating unit, a setting unit, and a control unit. The communicating unit (for example, a communicating unit 77), for example, communicates with a plurality of eyeglass manufacturing apparatuses. The setting unit (for example, a control unit 70), for example, sets one eyeglass manufacturing apparatus from a plurality of eyeglass manufacturing apparatuses as an eyeglass manufacturing apparatus of which the operation is assisted, according to a process (a work process of eyeglass manufacturing). The control unit (for example, the control unit 70), for example, causes the communicating unit to send an operating signal input in the terminal device to the eyeglass manufacturing apparatus which is set by the setting unit. In addition, the control unit, for example, causes the communicating unit to receive an input signal input in the eyeglass manufacturing apparatus which is set by the setting unit. Such a configuration allows operation of a plurality of eyeglass manufacturing apparatuses to be assisted by one terminal device and allows efficient manufacturing of eyeglasses.

A receiving unit and a sending unit, for example, are included as the communicating unit. A configuration may double as the receiving unit and the sending unit, or configurations that are separately disposed may be used as the receiving unit and the sending unit. For example, at least any of a wireless configuration and a wired configuration is used as the communicating unit. The terminal device, for example, communicates with a plurality of eyeglass manufacturing apparatuses by using at least any of a wireless configuration and a wired configuration. The communicating unit, for example, may be configured to include the control unit 70. A wireless configuration is exemplified by configurations of a wireless LAN, infrared communication, WiFi (registered trademark), and Bluetooth (registered trademark). A wired configuration is exemplified by configurations of a USB cable and a LAN cable.

The setting unit is exemplified by a configuration that sets, on the basis of an input signal which is input in the terminal device by an operator operating an operating unit (for example, a display unit (touch panel display unit) 75), one eyeglass manufacturing apparatus from a plurality of eyeglass manufacturing apparatuses as an eyeglass manufacturing apparatus of which the operation is assisted. In this case, the operator, for example, operates the operating unit and selects, from display related to a plurality of eyeglass manufacturing apparatuses displayed on a display of the terminal device, an eyeglass manufacturing apparatus of which the operation is assisted. The setting unit sets the selected eyeglass manufacturing apparatus as an eyeglass manufacturing apparatus of which the operation is assisted.

The operating unit, for example, receives various operational instructions provided by an examiner. A user interface of at least any of, for example, a touch panel, a mouse, a joystick, and a keyboard may be used for the operating unit. The operating unit is a touch panel in the present embodiment. Thus, the display functions as the operating unit as well.

The setting unit is exemplified by a configuration that sets, on the basis of an input signal which is sent from an eyeglass manufacturing apparatus and is input into the terminal device, one eyeglass manufacturing apparatus from a plurality of eyeglass manufacturing apparatuses as an eyeglass manufacturing apparatus of which the operation is assisted. In this case, the terminal device, for example, when receiving an input signal from an eyeglass manufacturing apparatus, sets the eyeglass manufacturing apparatus sending the input signal as an eyeglass manufacturing apparatus of which the operation is assisted. In addition, the terminal device, for example, when receiving an input signal from an eyeglass manufacturing apparatus, displays information related to the eyeglass manufacturing apparatus sending the input signal on the display of the terminal device. Information related to an eyeglass manufacturing apparatus is displayed (for example, displayed in a list) in a case where, for example, input signals are received from a plurality of eyeglass manufacturing glasses. An operator operates the operating unit to select an eyeglass manufacturing apparatus and sets the selected eyeglass manufacturing apparatus.

A configuration of an eyeglass manufacturing apparatus for sending an input signal may be such that an eyeglass manufacturing apparatus is configured to send an input signal after detection of the distance between the eyeglass manufacturing apparatus and the terminal device being less than or equal to a preset distance. In addition, a configuration of an eyeglass manufacturing apparatus for sending an input signal is exemplified by an eyeglass manufacturing apparatus that is configured to send an input signal at all times. In this case, the input signal may be configured to be input in the terminal device in a case where, for example, the distance between the eyeglass manufacturing apparatus and the terminal device becomes less than or equal to a predetermined distance.

The terminal device in the present embodiment, for example, may further include a display (for example, an operating unit 76) and a display control unit (for example, the control unit 70). The display control unit, for example, reads a plurality of work screens from a storage unit (for example, a storage unit 74) that stores a plurality of work screens assisting an operator operating each of a plurality of eyeglass manufacturing apparatuses, and displays the plurality of work screens on the screen of the display. The storage unit, for example, stores a plurality of work screens that assists an operator operating each of a plurality of eyeglass manufacturing apparatuses. The storage unit, for example, may be disposed in the terminal device, may be disposed in an eyeglass manufacturing apparatus, or may be disposed in a different apparatus from the terminal device and an eyeglass manufacturing apparatus.

A configuration that displays a plurality of work screens is exemplified by a configuration in which a plurality of work screens is displayed in thumbnails. In addition, for example, a plurality of work screens may be displayed to be changeable by using scroll. In this case, for example, a work screen may be changed by an operator scrolling on the screen of the display. At least one (for example, one, two, or three) work screen is provided for one eyeglass manufacturing apparatus. A plurality of work screens, for example, may be a plurality of work screens for a plurality of eyeglass manufacturing apparatuses or may be work screens for one eyeglass manufacturing apparatus. A work screen may be configured to be changed along with animation (for example, an animation that turns a page over or an animation that collapses the screen).

A configuration of a work screen is exemplified by at least one of an operation screen during operation of the eyeglass manufacturing apparatus set by the setting unit and a screen that is used for operating the eyeglass manufacturing apparatus set by the setting unit and for sending an operating signal based on a performed operation to the set eyeglass manufacturing apparatus. A work screen, for example, may be a screen that is displayed on a display unit of an eyeglass manufacturing apparatus.

A work screen, for example, the display state of a work screen, the state of an operation being performed on a work screen, and whether or not to display a work screen, may be changed according to whether or not the use of an eyeglass manufacturing apparatus is previously completed for the work screen. The display state of a work screen is changed in order for an operator to recognize completion in a case where, for example, the use of an eyeglass manufacturing apparatus on the work screen is completed. A configuration that changes the display state is exemplified by a configuration that changes the color of the display screen (for example, a configuration that displays the display screen in gray), a configuration that displays a mark (label) on the display screen, and a configuration that changes the display size. The state of an operation being performed on a work screen is changed in order for an operator to recognize completion in a case where, for example, the use of an eyeglass manufacturing apparatus on the work screen is completed. A configuration that changes the state of an operation being performed on a work screen is exemplified by a configuration that forbids input on a work screen by an operator and a configuration that restricts a part of input on a work screen by an operator. A configuration that controls whether or not to display a work screen in order for an operator to recognize completion in a case where, for example, the use of an eyeglass manufacturing apparatus on the work screen is completed is exemplified by a configuration that does not display a work screen of an eyeglass manufacturing apparatus of which the use is completed.

One eyeglass manufacturing apparatus, in a case where, for example, such a work screen described above is used, may be set from a plurality of eyeglass manufacturing apparatuses on the basis of a work screen of at least one eyeglass manufacturing apparatus that is selected by a selecting unit from a plurality of work screens displayed on the display.

A configuration that causes the selecting unit to make selection from a plurality of work screens is exemplified by a configuration in which a work screen is selected by an operator scrolling on the display. In this case, for example, an operator makes a scrolling motion to display, on the display, an eyeglass manufacturing apparatus that is desired to be used by the operator. In addition, a configuration that causes the selecting unit to make selection from a plurality of work screens is exemplified by a configuration in which a work screen is selected by selecting, from a plurality of work screens displayed in thumbnails, a work screen of an eyeglass manufacturing apparatus that is desired to be used by an operator. In addition, a configuration that causes the selecting unit to make selection from a plurality of work screens is exemplified by a configuration that receives a signal output from an eyeglass manufacturing apparatus and displays a received work screen of the eyeglass manufacturing apparatus to allow an operator to make selection. In this case, for example, the display control unit causes a distance detecting unit to detect the distances among the terminal device and a plurality of eyeglass manufacturing apparatuses and selects and displays a work screen of an eyeglass manufacturing apparatus according to the distance between the terminal device and the eyeglass manufacturing apparatus (for example, displays a work screen of an eyeglass manufacturing apparatus for which the distance between the terminal device and the eyeglass manufacturing apparatus is less than or equal to a preset distance). An operator selects a work screen of an apparatus desired to be used from displayed work screens. Since, in this manner, an operator can set an eyeglass manufacturing apparatus to be used while checking a work screen of each eyeglass manufacturing apparatus, the apparatus to be used can be easily recognized. In addition, since work screens respectively corresponding to a plurality of eyeglass manufacturing apparatuses can be checked, an apparatus for which measurement, setting, and the like are not completed in eyeglass manufacturing can be easily recognized.

The storage unit, for example, may store a plurality of work screens of a plurality of eyeglass manufacturing apparatuses that is used in processes until manufacturing of eyeglasses. That is, each work screen of eyeglass manufacturing apparatuses for performing at least two processes when eyeglasses are manufactured (at least two processes in all processes of eyeglass manufacturing) are stored as one eyeglass manufacturing data. The setting unit, for example, may set, from a plurality of eyeglass manufacturing apparatuses, at least one eyeglass manufacturing apparatus of which the operation is assisted, on the basis of a work screen that is selected by the selecting unit from a plurality of work screens stored in the storage unit. In this manner, collectively storing work screens of a plurality of eyeglass manufacturing apparatuses used for manufacturing eyeglasses allows an operator inexperienced in eyeglass manufacturing to easily recognize an apparatus that is required to be used when eyeglasses are manufactured. Accordingly, eyeglasses can be smoothly manufactured.

The storage unit, for example, may store a plurality of work screens and the order of the plurality of work screens that is set in such a manner that the order of use of a plurality of eyeglass manufacturing apparatuses is set to an order of use when eyeglasses are manufactured. The display control unit, for example, may display the plurality of work screens on the screen of the display in the set order. A configuration that displays a plurality of work screens on the screen of the display in a set order is exemplified by a configuration in which work screens are scrolled in the order of processes of eyeglass manufacturing in a case where an operator makes a scrolling motion on the screen of the display. In addition, a configuration that displays a plurality of work screens on the screen of the display in a set order is exemplified by a configuration that linearly displays a plurality of work screens in a list in the order of processes of eyeglass manufacturing. In this case, an operator, for example, may select a work screen of a desired process from the plurality of work screens displayed in a list. The display control unit may display the selected work screen in an enlarged manner on the display. Since, in this manner, work screens are displayed in a work order when eyeglasses are manufactured, even an operator inexperienced in eyeglass manufacturing can easily recognize a series of flows when eyeglasses are manufactured.

The control unit, in such a configuration that displays a plurality of work screens on the screen of the display in a set order, may restrict sending of an operating signal to an eyeglass manufacturing apparatus from a work screen of an eyeglass manufacturing apparatus that is used in a work process subsequent to a work process in which work on a work screen of an eyeglass manufacturing apparatus is not completed in manufacturing processes for eyeglasses. Such a configuration can prevent erroneous proceeding of a series of work processes when eyeglasses are manufactured. Accordingly, eyeglasses can be smoothly manufactured. In addition, since even an operator inexperienced in manufacturing of eyeglasses operates eyeglass manufacturing apparatuses in accordance with work screens displayed on the display, eyeglasses can be easily manufactured.

The terminal device, for example, may include a changing unit that changes a work screen. A plurality of work screens stored in the storage unit, for example, can be changed to any combination of work screens. A configuration that can change a plurality of work screens to any combination is exemplified by a configuration in which an operator can arbitrarily add or remove a work screen. In addition, for example, a configuration that can change a plurality of work screens to any combination may be a configuration that reads a function of an eyeglass manufacturing apparatus (for example, in a case where the cup attaching apparatus has a lens metering function and a cup attaching function) and causes the control unit to change the combination of work screens. Such a configuration allows assisting of any eyeglass manufacturing apparatus only and allows setting of a desired eyeglass manufacturing process.

<Apparatus Selecting Function>

The terminal device, for example, may select an eyeglass manufacturing apparatus to be used in a case where there exists a plurality of eyeglass manufacturing apparatuses of the same type in a common work process. In this case, for example, the terminal device may be any terminal device for assisting operation of a plurality of eyeglass manufacturing apparatuses used for manufacturing eyeglasses. For example, the terminal device may be a terminal device that assists operation of a plurality of eyeglass manufacturing apparatuses used for performing the same process in processes of manufacturing eyeglasses. In addition, for example, the terminal device may be a terminal device that assists operation of a plurality of eyeglass manufacturing apparatuses of different types used for performing different processes in processes of manufacturing eyeglasses.

In this case, for example, the terminal device includes the communicating unit, an obtaining unit (for example, the control unit 70), the setting unit, and the control unit. Eyeglass manufacturing apparatuses of the same type are not limited to eyeglass manufacturing apparatuses that have completely the same configuration (eyeglass manufacturing apparatuses of the same model). For example, any eyeglass manufacturing apparatuses that have at least a function for performing the same process may be used. For example, eyeglass manufacturing apparatuses of the same type may be eyeglass manufacturing apparatuses of different versions or may be eyeglass manufacturing apparatuses in which a partial configuration is added or removed.

In this case, for example, the communicating unit communicates with a plurality of eyeglass manufacturing apparatuses of the same type that is used for performing a common process in processes of manufacturing eyeglasses. Apparently, the communicating unit may be configured to communicate with a plurality of eyeglass manufacturing apparatuses of the same type and a plurality of eyeglass manufacturing apparatuses of different types.

The obtaining unit, for example, obtains standby information for a plurality of eyeglass manufacturing apparatuses of the same type. The setting unit, for example, sets one eyeglass manufacturing apparatus from a plurality of eyeglass manufacturing apparatuses of the same type as an eyeglass manufacturing apparatus of which the operation is assisted, on the basis of the standby information of the obtaining unit. The standby information is, for example, information that indicates whether or not an eyeglass manufacturing apparatus is in a standby state. That is, the standby information is information that indicates whether or not an eyeglass manufacturing apparatus is in an available state. The standby information, in a case where, for example, an eyeglass manufacturing apparatus is in a standby state, indicates that the eyeglass manufacturing apparatus can be immediately used. The standby information, in a case where, for example, an eyeglass manufacturing apparatus is not in a standby state, indicates a state where the eyeglass manufacturing apparatus cannot be immediately used. A case where, for example, an eyeglass manufacturing apparatus is in an unavailable state is exemplified by a case where an eyeglass manufacturing apparatus is being used, a case where an eyeglass manufacturing apparatus is powered down, and a case where an eyeglass manufacturing apparatus fails to function.

The obtaining unit, for example, as a configuration that obtains the standby information, receives the standby information sent from an eyeglass manufacturing apparatus and thereby obtains the standby information. A configuration that obtains the standby information is exemplified by a configuration in which the standby information is obtained by communication from the terminal device to an eyeglass manufacturing apparatus. More specifically, the obtaining unit, for example, may obtain information as to a standby state by sending a signal checking a standby state from the terminal device to each of a plurality of eyeglass manufacturing apparatuses and receiving a response signal from the eyeglass manufacturing apparatus. In addition, a configuration that obtains the standby information is exemplified by a configuration that obtains the standby state in such a manner that an eyeglass manufacturing apparatus sends the standby information to the terminal device on the basis of a preset condition (for example, the distance between the terminal device and each eyeglass manufacturing apparatus is less than or equal to a preset distance) and that the terminal device receives a signal sent from the eyeglass manufacturing apparatus. In addition, a configuration that obtains the standby information is exemplified by a configuration in which the standby state is obtained by the terminal device receiving a signal that is transmitted from an eyeglass manufacturing apparatus at all times or at a certain timing. More specifically, the obtaining unit, for example, may be configured in such a manner that a signal as to whether or not each of a plurality of eyeglass manufacturing apparatuses is in a standby state is transmitted (sent) from the plurality of eyeglass manufacturing apparatuses to the terminal device at all times or at a certain timing and that the standby information is obtained according to whether or not the terminal device can receive the transmitted signal (for example, a configuration that transmits a signal at all times or at a certain timing in a case where an eyeglass manufacturing apparatus is in a standby state, and determines a standby state in a case where the terminal device can receive the signal).

The setting unit, for example, sets at least one eyeglass manufacturing apparatus from a plurality of eyeglass manufacturing apparatuses of the same type as an eyeglass manufacturing apparatus of which the operation is assisted, on the basis of the standby information of the obtaining unit. One eyeglass manufacturing apparatus may be set as an eyeglass manufacturing apparatus to be set, or two or more eyeglass manufacturing apparatuses may be set. A configuration that sets at least one eyeglass manufacturing apparatus from a plurality of eyeglass manufacturing apparatuses of the same type is exemplified by a configuration in which the setting unit, on the basis of the standby information, sets an eyeglass manufacturing apparatus in a standby state as an eyeglass manufacturing apparatus of which the operation is assisted. Eyeglass manufacturing apparatuses of which the operation is assisted may be set in a preset order (for example, the order in which eyeglass manufacturing apparatuses are registered, or the order of new versions of eyeglass manufacturing apparatuses) in a case where a plurality of eyeglass manufacturing apparatuses of the same type is in a standby state. In addition, a configuration that sets one eyeglass manufacturing apparatus from a plurality of eyeglass manufacturing apparatuses of the same type is exemplified by a configuration in which an eyeglass manufacturing apparatus in a standby state is displayed on the display and is selected by an operator operating the operating unit and in which the setting unit sets the selected eyeglass manufacturing apparatus as an eyeglass manufacturing apparatus of which the operation is assisted.

The control unit, for example, causes the communicating unit to send an operating signal input in the terminal device to the eyeglass manufacturing apparatus which is set by the setting unit. In addition, the control unit, for example, causes the communicating unit to receive an input signal input in the eyeglass manufacturing apparatus which is set by the setting unit.

In this manner, selecting an eyeglass manufacturing apparatus to be used from a plurality of eyeglass manufacturing apparatuses on the basis of a standby state in a case where there exists a plurality of eyeglass manufacturing apparatuses of the same type allows an available eyeglass manufacturing apparatus to be easily selected from a plurality of eyeglass manufacturing apparatuses of the same type. Accordingly, an eyeglass manufacturing apparatus can be smoothly used.

At least one eyeglass manufacturing apparatus may be set in a case where, for example, there exists a plurality of eyeglass manufacturing apparatuses in at least one process of a plurality of processes for manufacturing eyeglasses. In this case, for example, the terminal device is a terminal device for assisting operation of a plurality of eyeglass manufacturing apparatuses used for performing the same process and assisting operation of a plurality of eyeglass manufacturing apparatuses of different types used for performing different processes in processes of manufacturing eyeglasses. The communicating unit, for example, communicates with a plurality of eyeglass manufacturing apparatuses of the same type and a plurality of eyeglass manufacturing apparatuses of different types. The obtaining unit, for example, obtains the standby information for a plurality of eyeglass manufacturing apparatuses of the same type in a case where there exists a plurality of eyeglass manufacturing apparatuses of the same type in at least any work process of each work process (each process) when eyeglasses are manufactured. In this manner, an available eyeglass manufacturing apparatuses can be easily selected in each work process in a case where there exists a plurality of eyeglass manufacturing apparatuses in any work process of each work process for manufacturing eyeglasses. Accordingly, eyeglasses can be smoothly manufactured.

A configuration that obtains information as to whether or not there exists a plurality of eyeglass manufacturing apparatuses of the same type is exemplified by a configuration in which a determining unit that determines whether or not there exists a plurality of eyeglass manufacturing apparatuses is provided in each process for manufacturing eyeglasses. In this case, the determining unit, for example, may make determination in each process by receiving the number of signals transmitted from an eyeglass manufacturing apparatus for each process. In addition, a configuration that obtains information as to whether or not there exists a plurality of eyeglass manufacturing apparatuses of the same type is exemplified by a configuration in which an eyeglass manufacturing apparatus possessed by an operator is registered (set) in advance.

The standby information is obtained in each process in a case where there exists a plurality of eyeglass manufacturing apparatuses in each of all processes, and one eyeglass manufacturing apparatus is set in each process. The obtaining unit, for example, detects whether or not there exists a plurality of eyeglass manufacturing apparatuses of the same type in each work process when eyeglasses are manufactured, and obtains the standby information for the plurality of eyeglass manufacturing apparatuses of the same type in a work process in which existence of a plurality of eyeglass manufacturing apparatuses of the same type is detected. The setting unit, for example, on the basis of the standby information of the obtaining unit, sets one eyeglass manufacturing apparatus as an eyeglass manufacturing apparatus of which the operation is assisted, in each work process when eyeglasses are manufactured. Since, in this manner, an eyeglass manufacturing apparatus to be used is set in each work process of manufacturing eyeglasses, operation of each eyeglass manufacturing apparatus can be assisted by one terminal device, and each work process can be smoothly performed. Accordingly, eyeglasses can be more smoothly manufactured.

The display control unit may display, on the screen of the display of the terminal device, a work screen that assists operation of the eyeglass manufacturing apparatus set by the setting unit. In this manner, displaying a work screen allows operation of a plurality of eyeglass manufacturing apparatuses to be assisted by one terminal device and allows an eyeglass manufacturing apparatus to be smoothly used.

<Handover Function in Eyeglass Manufacturing Processes>

A configuration, for example, that can perform a handover at a point midway of eyeglass manufacturing processes may be disposed in the terminal device. In this case, for example, the terminal device assists operation of a plurality of eyeglass manufacturing apparatuses that is used for performing different processes in processes of manufacturing eyeglasses. The terminal device, for example, includes the display control unit and the control unit. In this case, for example, the display control unit reads a work screen from the storage unit that stores a plurality of work screens which assists an operator operating each of a plurality of eyeglass manufacturing apparatuses and the order of a plurality of work screens which is set in such a manner that the order of use of the plurality of eyeglass manufacturing apparatuses is set to an order of use when eyeglasses are manufactured, and displays the work screen on the display of the terminal device.

In this case, for example, the control unit, in a case where the communicating unit receives a switch signal that switches one terminal device for assisting operation of a plurality of eyeglass manufacturing apparatuses to another terminal device, causes the communicating unit to send, to another terminal device, work data that is obtained until reception of the switch signal through an operation performed by an operator on the work screen displayed on the display, and causes the communicating unit to receive work data that is sent from another terminal device.

A configuration that inputs the switch signal is exemplified by a configuration in which the switch signal is transmitted from a switching unit disposed in the terminal device. In this case, for example, the switch signal may be input by an operator operating a switch that is disposed in the terminal device (for example, configured to be disposed as a part of the terminal device or configured to be displayed on the display of the terminal device) for input of the switch signal. For example, the switch signal may be input in a case where the distance between a first terminal device (the present terminal device) and a second terminal device (another terminal device) becomes equal to a preset distance. In addition, a configuration that inputs the switch signal is exemplified by a configuration in which the switch signal is transmitted from the switching unit that is disposed in another apparatus different from the terminal device (for example, an eyeglass manufacturing apparatus or a PC). In this case, for example, the switch signal may be input by an operator selecting a switch disposed in another apparatus.

The display control unit, for example, displays a work screen based on work data on the display in a case where the communicating unit receives work data sent from another terminal device. Such a configuration allows a work process that is handed over to be easily recognized even in a case of handing work over to a different operator at a point midway of eyeglass manufacturing processes, and thus a work process can be smoothly handed over. In addition, the operator to which a work process is handed over can easily recognize a work process in which work is to be resumed. Accordingly, the problem of resuming work in an erroneous work process can be prevented, and a handover can be favorably performed.

The work data that is obtained until reception of the switch signal through an operation performed by an operator on a work screen displayed on the display is exemplified as being configured to include, for example, information as to completion of an operation performed by an operator on a plurality of work screens of each of a plurality of eyeglass manufacturing apparatuses. In this case, for example, the display control unit, in a case where the communicating unit receives work data sent from another terminal device, displays a work screen, among a plurality of work screens, of a process subsequent to a work screen on which an operation is completed, on the display on the basis of the work data. For example, a subsequent process may be a process, in a series of eyeglass manufacturing processes, that is immediately subsequent to a process corresponding to a work screen on which an operation is completed. In addition, for example, a subsequent process may be a process, in a series of eyeglass manufacturing processes, that is after a process corresponding to a work screen on which an operation is completed. In this manner, displaying a work screen of a process subsequent to a completed process allows easy recognition of a work process to which work is completed in a case where work is handed over, and can prevent a previously completed work process from being erroneously performed again. Accordingly, eyeglasses can be smoothly manufactured.

The work data that is obtained until reception of the switch signal through an operation performed by an operator on a work screen displayed on the display is exemplified as being configured to include, for example, information as to a point midway of an operation performed by an operator on a work screen of one eyeglass manufacturing apparatus of a plurality of work screens. In this case, for example, the display control unit, in a case where the communicating unit receives work data sent from another terminal device, displays, on the display on the basis of the work data, the state at a point midway of an operation performed on a work screen of one eyeglass manufacturing apparatus. In this manner, a handover can be easily performed to another operator even in a case where a handover is performed at a point midway of assisting an eyeglass manufacturing apparatus in one process. For example, an immediately subsequent operator is not required to restart operation of an eyeglass manufacturing apparatus and can smoothly manufacture eyeglasses.

The terminal device may further include a measuring unit (for example, the control unit 70). The measuring unit, for example, measures elapsed time from the start timing of an operation performed by an operator on a work screen displayed on the display of the terminal device. The display control unit, for example, displays the elapsed time measured by the measuring unit on the display. Since, in this manner, an operator who performs a handover to a different operator and an operator to which work is handed over at a point midway of eyeglass manufacturing work processes can check time from the start of eyeglass manufacturing, a delay in eyeglass manufacturing and the like can be recognized, and a subsequent action such as prioritizing work in order to recover the delay can be taken considering the time until completion of eyeglass manufacturing.

While the control unit 70 illustratively doubles as the setting unit, the control unit, the display control unit, the obtaining unit, and the measuring unit in the present embodiment, the present disclosure is not limited thereto. For example, different control units may be configured to be used as the setting unit, the control unit, the display control unit, the obtaining unit, and the measuring unit.

A plurality of eyeglass manufacturing apparatuses may be operated by using a plurality of terminal devices. For example, the same eyeglass manufacturing apparatus may be correlated with a plurality of terminal devices. In such a case, a terminal device that previously obtains an operating permission may operate an eyeglass manufacturing apparatus, and a terminal device that subsequently obtains an operating permission may not be operated until the end of the operation of the terminal device that previously obtains an operating permission.

The present invention is not limited to the device described in the present embodiment. For example, terminal control software (program) that performs the function of the embodiment is supplied to a system or an apparatus through a network, various storage media, and the like. A control device of the system or the apparatus (for example, a CPU) can read and execute the program.

Example

Hereinafter, a terminal device of a present example will be described. FIG. 1 is a diagram illustrating an eyeglass manufacturing system according to the present disclosure. An information processing terminal device (hereinafter, described as a terminal device) 10 of the present example, for example, assists operation of a plurality of eyeglass manufacturing apparatuses 11 that is used for manufacturing eyeglasses. More specifically, for example, the terminal device 10, for example, the terminal device 10 of the present example, assists operation of the plurality of eyeglass manufacturing apparatuses 11 that is used for performing different processes in processes of manufacturing eyeglasses (refer to FIG. 1). The terminal device 10, for example, may assist operation of a plurality of eyeglass manufacturing apparatuses 5a to 5c of the same type that is used for performing a common process in processes of manufacturing glasses (refer to FIG. 9).

An eyeglass lens processing system 1 illustrated in FIG. 1, for example, includes the plurality of eyeglass manufacturing apparatuses 11 and the information processing terminal device (hereinafter, may be simply referred to as a terminal device) 10. The plurality of eyeglass manufacturing apparatuses 11, for example, includes a lensmeter 2, a cup attaching apparatus (blocker) 3, a subjective optometric apparatus 4, and a lens processing apparatus (lens edger) 5 in the present example. Apparently, the plurality of eyeglass manufacturing apparatuses 11 is not limited to the eyeglass manufacturing apparatuses. For example, the plurality of eyeglass manufacturing apparatuses 11 may be an eyeglass rim shape measuring apparatus (tracer), an objective optometric apparatus (eye refractive power measurement apparatus), and the like. In addition, for example, the plurality of eyeglass manufacturing apparatuses 11 may be at least two eyeglass manufacturing apparatuses. The tracer is configured to be integrated with the blocker 3 in the present example.

The lensmeter 2, the blocker 3, the subjective optometric apparatus 4, the lens edger 5, and the terminal device 10, for example, may be connected to each other through a communication network. The communication network, for example, may be wired or may be wireless. The eyeglass lens processing system 1, for example, may include a shared server. The shared server may include, for example, a control unit and a memory. In the case of a configuration that includes the shared server, for example, the plurality of eyeglass manufacturing apparatuses 11 and the terminal device 10 may be connected via the shared server. In this case, for example, various types of data (various programs, an initial value, a work screen, the order of work screens, measurement results for the plurality of eyeglass manufacturing apparatuses 11, and the like described later) may be stored in the memory of the shared server.

The lensmeter 2, for example, is an apparatus for measuring an optical characteristic of an eyeglass lens, the optical center of an eyeglass lens, and the like. The lensmeter 2, for example, includes a measuring optical system (for example, a Shack-Hartmann optical system) 6 and measures at least any of an optical characteristic of an eyeglass lens and the optical center of an eyeglass lens. The lensmeter 2 may further include a marking mechanism 7 and may mark a point at the optical center measured by the measuring optical system 6. Apparently, the configuration of the lensmeter 2 is not limited to this configuration. The lensmeter 2 may include a different measuring optical system.

The blocker 3, for example, is an apparatus that attaches a cup to an eyeglass lens. The cup is used as a jig for the lens edger 5 to hold the eyeglass lens. For example, the blocker 3 attaches the cup to the eyeglass lens by using the point marked by the lensmeter 2 at the optical center of the eyeglass lens as a reference. The blocker 3, for example, includes a camera 8, and the cup may be attached by automatically detecting the marked point, or the cup may be attached by a user aligning the position of the marked point to a scale. The blocker 3 includes a tracer in the present example. Apparently, the tracer may be separately provided or may be disposed in another eyeglass manufacturing apparatus (for example, a lens edger and the like). The tracer not illustrated, for example, is an apparatus for measuring the target lens shape of an eyeglass frame. The tracer not illustrated, for example, may cause a tracing stylus not illustrated to follow the rim of the eyeglass frame and measure the target lens shape of the eyeglass frame on the basis of the track of the tracing stylus. Traced outline data, for example, is obtained before the blocker attaches the cup to the eyeglass lens in the present example.

The subjective optometric apparatus 4, for example, is an apparatus for measuring the visual function of both eyes of an examinee. The subjective optometric apparatus 4, for example, includes at least any of a visual target presenting unit 13 that presents a visual target to the examinee, and a refractor 15. A light pencil of a visual target is presented from the visual target presenting unit 13 to the examinee, and the examinee identifies the presented visual target through an examination window of the refractor 15, and thereby examination is performed. The subjective optometric apparatus may be a subjective optometric apparatus in which an optical member such as an optical element included in the refractor 15 is arranged in a visual target presenting unit.

The lens edger (hereinafter, simply referred to as an edger) 5, for example, is an apparatus for processing the periphery of an eyeglass lens into the target lens shape of the eyeglass frame. The edger 5 includes a processing tool (for example, a grindstone, a cutter, and the like) and processes the periphery of the eyeglass lens on the basis of the traced outline data of the eyeglass frame obtained by the tracer not illustrated.

The terminal device 10, for example, operates the plurality of eyeglass manufacturing apparatuses 11 in the present example. Apparently, the terminal device 10 may be configured to simply display a screen (observation screen) during an operation performed by an operator for the plurality of eyeglass manufacturing apparatuses 11. The terminal device 10, for example, is communicably connected to the plurality of eyeglass manufacturing apparatuses 11. The terminal device 10, for example, is connected to the plurality of eyeglass manufacturing apparatuses 11 in at least any of a wireless manner and a wired manner. The terminal device 10 may be, for example, a tablet PC, a laptop PC, a smartphone, or a desktop PC.

Figure 2:
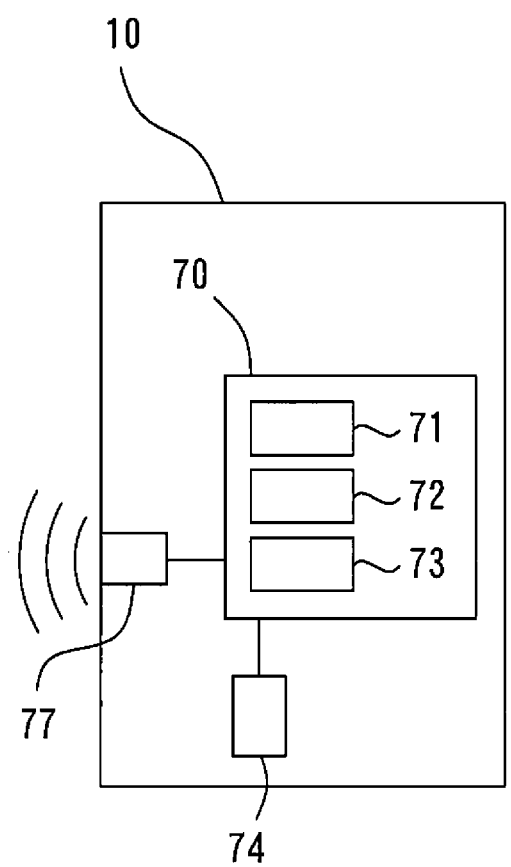
FIG. 2 illustrates a schematic configuration diagram of a terminal device according to the present disclosure.

FIG. 2 illustrates a schematic configuration diagram of the terminal device 10 according to the present disclosure. The terminal device 10 includes, for example, the control unit 70, the communicating unit 77, the operating unit 76, and the display unit (display) 75. The control unit 70 is realized by, for example, a general central processing unit (CPU) 71, a ROM 72, and a RAM 73. The CPU 71 of the control unit 70 controls the entirety of the terminal device. The ROM 72 stores various programs, an initial value, and the like for controlling operation of the terminal device 10. The RAM 73 temporarily stores various types of information. The control unit 70 may be configured of a plurality of control units (that is, a plurality of processors).

The storage unit (memory) 74, the display unit 75, the operating unit 76, and the communicating unit 77, for example, are electrically connected to the control unit 70. The storage unit 74 is a non-transient storage medium that can retain a stored content even if supply of power is shut off. A hard disk, a flash ROM, or a detachable USB memory, for example, can be used as the storage unit 74. The storage unit 74, for example, stores a plurality of work screens that assists an operator operating each of a plurality of eyeglass manufacturing apparatuses. More specifically, the storage unit 74, for example, stores a plurality of work screens and the order of the plurality of work screens that is set in such a manner that the order of use of a plurality of eyeglass manufacturing apparatuses is set to an order of use when eyeglasses are manufactured. Apparently, the storage unit 74 may be configured to store only a plurality of work screens.

The communicating unit 77, for example, communicates with, for example, the plurality of eyeglass manufacturing apparatuses 11. The communicating unit 77, for example, may send and receive an electromagnetic wave and the like with each eyeglass manufacturing apparatus 11. The communicating unit 77 may communicate with the eyeglass manufacturing apparatus 11 by, for example, a wireless LAN, infrared communication, WiFi (registered trademark), or Bluetooth (registered trademark). An Internet line may also be used. Apparently, the communicating unit 77 may communicate with each eyeglass manufacturing apparatus 11 by wired connection such as a USB cable and a LAN cable.

The display unit 75, for example, displays, for example, a work screen corresponding to each eyeglass manufacturing apparatus 11 and a measurement result received from each eyeglass manufacturing apparatus 11. A display of a personal computer (hereinafter, referred to as a "PC") may be used. A plurality of displays may be used together. The display unit 75 may have a touch panel function. The display unit 75 may be a display mounted in an apparatus main body or may be a display connected to the main body. A display of a personal computer (hereinafter, referred to as a "PC") may be used. A plurality of displays may be used together. The display unit 75 may be a touch panel. The display unit 75 functions as the operating unit 76 in a case where the display unit 75 is a touch panel. The display unit 75 is used as an operating unit in the present example.

The operating unit 76 receives various operational instructions provided by an examiner. The operating unit 76 outputs an operating signal corresponding to the input operational instruction to the control unit 70. A user interface of at least any of, for example, a touch panel, a mouse, a joystick, and a keyboard may be used for the operating unit 76. The display unit 75 is a touch panel in the present example, and the display unit 75 functions as the operating unit 76.

<Connection between Terminal Device and Eyeglass Manufacturing Apparatus>

Each eyeglass manufacturing apparatus 11 connected to the terminal device 10, for example, includes a communicating unit (for example, a communicating unit). The lensmeter 2, for example, includes a communicating unit 15. The blocker 3, for example, includes a communicating unit 16. The subjective optometric apparatus 4, for example, includes a communicating unit 18 of the visual target presenting unit 13 and a communicating unit 19 of the refractor 15. The edger 5, for example, includes a communicating unit 17. The communicating unit 77 of the terminal device 10, for example, sends and receives a signal with the communicating unit 15 to the communicating unit 19 of the plurality of eyeglass manufacturing apparatuses 11. That is, the terminal device 10 sends an operating signal input in the terminal device 10 to the eyeglass manufacturing apparatus 11. In addition, the terminal device 10, for example, receives an input signal that is input in the eyeglass manufacturing apparatus 11. Therefore, an operator is not required to operate each eyeglass manufacturing apparatus 11 nearby and may simply check the states of the plurality of eyeglass manufacturing apparatuses 11 and measurement results from a separated location by using the terminal device 10.

<Display of Work Screen>

Figure 3:
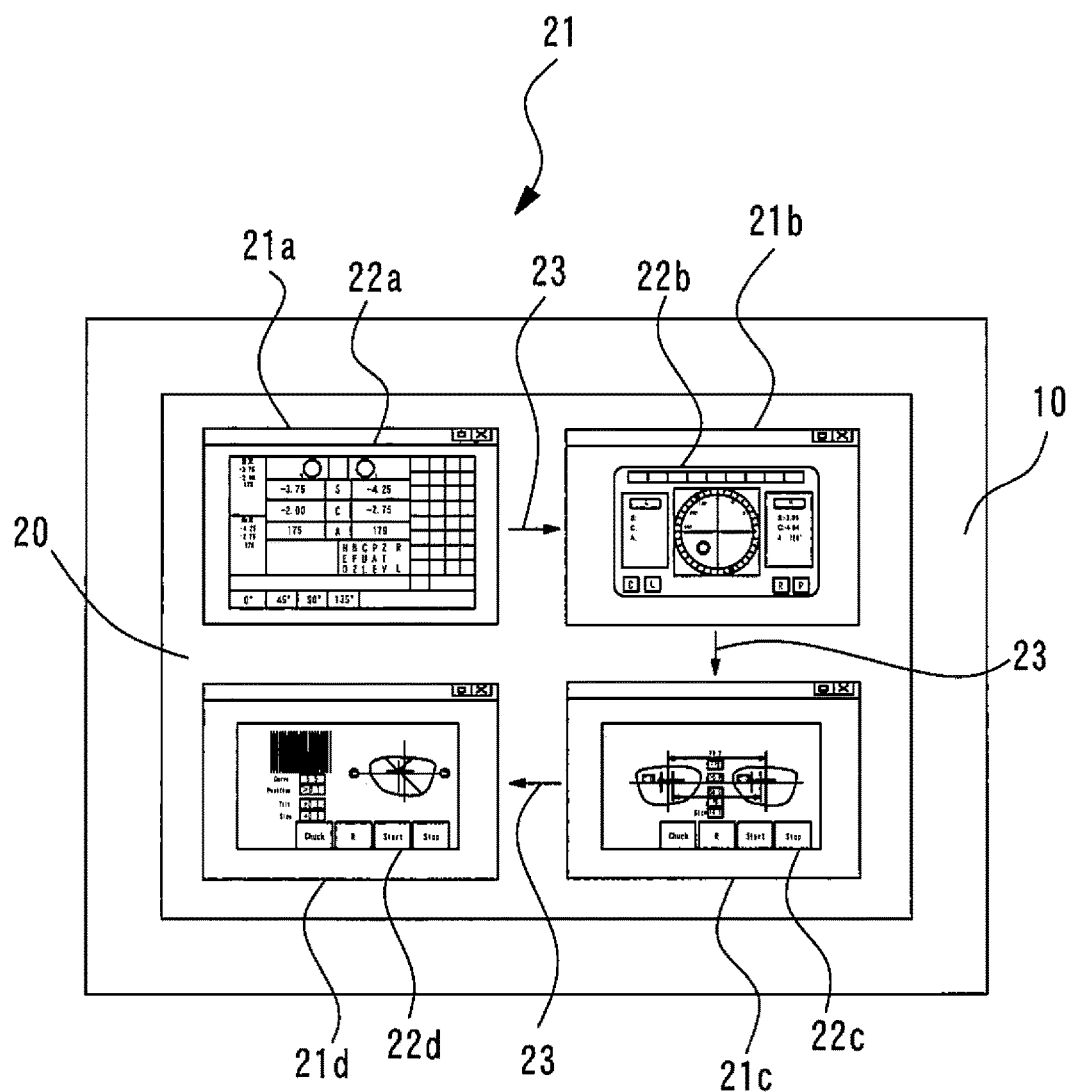
FIG. 3 is a diagram illustrating one example of a display screen of a display unit.

FIG. 3 is a diagram illustrating one example of a display screen of the display unit 75. A display screen 20, for example, is displayed on the display unit 75. The display screen 20, for example, may be a work screen (for example, an operating screen or an observation screen) that is displayed on the display unit of each eyeglass manufacturing apparatus 11. In this case, a work screen of one eyeglass manufacturing apparatus may be displayed, or a plurality of work screens of the plurality of eyeglass manufacturing apparatuses 11 may be displayed. In addition, a plurality of work screens may be configured to be set for one eyeglass manufacturing apparatus. In addition, the display screen 20, for example, may include an image, a shape, a name, or the like that calls each eyeglass manufacturing apparatus 11 to mind, or may be a combination thereof.

The display screen 20 in the present example, for example, will be exemplified by a configuration in which a plurality of work screens of the plurality of eyeglass manufacturing apparatuses 11 is displayed. More specifically, the display screen 20 in the present example, for example, will be exemplified by a configuration in which a plurality of operating regions 21 of work screens corresponding to the plurality of eyeglass manufacturing apparatuses 11 is displayed. The control unit 70, for example, linearly displays operating regions of work screens respectively corresponding to the different eyeglass manufacturing apparatuses 11 on the display unit 75.

Each of operating regions 21a to 21d, for example, is displayed in an order of upper left (upper left on the page), upper right, lower right, and lower left so as to be in an order in which the plurality of eyeglass manufacturing apparatuses 11 is used, in eyeglass manufacturing processes. That is, each of the operating regions 21a to 21d is displayed in such a manner that the order of use of the plurality of eyeglass manufacturing apparatuses 11 is set to an order of use when eyeglasses are manufactured. Apparently, the operating regions 21a to 21d are not limited to the configuration provided that the operating regions 21a to 21d are configured to be displayed in such a manner that the order of eyeglass manufacturing processes can be identified by an operator. While each of the operating regions 21a to 21d in the present example is exemplified as being configured to be displayed in such a manner that the order of use of the plurality of eyeglass manufacturing apparatuses 11 is set to an order of use when eyeglasses are manufactured, the present disclosure is not limited thereto. Each of the operating regions 21a to 21d may be configured in such a manner that the order of use of the plurality of eyeglass manufacturing apparatuses 11 is not set to an order of use when eyeglasses are manufactured. In addition, for example, not all operating regions of the plurality of eyeglass manufacturing apparatuses 11 may be displayed in a list.

The operating region 21a, for example, is an operating region displaying a first work screen 22a that assists an operator operating the subjective optometric apparatus 4. The operating region 21b, for example, is an operating region displaying a second work screen 22b that assists an operator operating the lensmeter 2. The operating region 21c, for example, is an operating region displaying a third work screen 22c that assists an operator operating the blocker 3. The operating region 21d, for example, is an operating region displaying a fourth work screen 22d that assists an operator operating the edger 5.

An arrow mark 23, for example, is a mark for indicating the order of eyeglass manufacturing processes. Operating the plurality of eyeglass manufacturing apparatuses 11 in the order of the arrow mark 23 allows each process of eyeglass manufacturing to be performed as in the order.

An operator, for example, checks the states of the plurality of eyeglass manufacturing apparatuses 11 and measurement results from the operating regions 21 displayed on the display unit 75. Specific operational input is provided by an operator in the operating regions 21 displayed on the display unit 75, and thereby one eyeglass manufacturing apparatus is set according to a process from the plurality of eyeglass manufacturing apparatuses 11 as an eyeglass manufacturing apparatus of which the operation is assisted. Apparently, a configuration that sets one eyeglass manufacturing apparatus according to a process from the plurality of eyeglass manufacturing apparatuses 11 as an eyeglass manufacturing apparatus of which the operation is assisted is not limited thereto. For example, a configuration that sets one eyeglass manufacturing apparatus from the plurality of eyeglass manufacturing apparatuses 11 according to a process may be a configuration that performs the setting by receiving input signals sent from a plurality of eyeglass manufacturing apparatuses. In addition, for example, a configuration in which eyeglass manufacturing apparatuses are set in order as in the order of eyeglass manufacturing processes may be used.

<Control Operation>

Operation of the plurality of eyeglass manufacturing apparatuses 11 using the terminal device 10 described heretofore will be described on the basis of the flowchart of FIG. 4. An operator, for example, checks the state of the plurality of eyeglass manufacturing apparatuses 11 and supports measurement by using the terminal device 10.

It is preferable for an operator to perform setting (for example, pairing) that correlates the terminal device 10 with the plurality of eyeglass manufacturing apparatuses 11, before using the plurality of eyeglass manufacturing apparatuses 11. The control unit 70, for example, may receive electromagnetic waves output from the plurality of eyeglass manufacturing apparatuses 11 and store information as to the electromagnetic waves (for example, identification signals) in the storage unit 74. Accordingly, the control unit 70 can identify electromagnetic waves from the plurality of eyeglass manufacturing apparatuses 11.

The control unit 70, for example, reads, from the storage unit 74, the display screen 20 (refer to FIG. 3) on which the plurality of operating regions 21 corresponding to the plurality of eyeglass manufacturing apparatuses 11 is displayed, and displays the display screen 20 on the display unit 75. An operator, for example, selects an operating region corresponding to an eyeglass manufacturing apparatus to be used from the operating regions 21 corresponding to the plurality of eyeglass manufacturing apparatuses 11. An operator, for example, selects the operating region 21 of an eyeglass manufacturing apparatus to be used by the operator from the display screen 20 by a touch operation on the display unit 75. When, for example, the operating region 21 is touched by the operator, the display unit 75 detects the touch operation and sends an operating signal to the control unit 70. The control unit 70, for example, receives the operating signal from the display unit 75.

A combination of work screens stored in the storage unit 74 and displayed on the display screen can be arbitrarily changed. For example, an eyeglass manufacturing apparatus to be used may be selected in advance by an operator, and a work screen corresponding to the selected eyeglass manufacturing apparatus may be stored. In addition, signals from the plurality of eyeglass manufacturing apparatuses 11 may be received, and received work screens of eyeglass manufacturing apparatuses may be stored.

While a display screen on which the plurality of operating regions 21 related to a plurality of work screens is displayed is exemplified in the present example, the present disclosure is not limited thereto. For example, a display screen may be configured in such a manner that a work screen of one eyeglass manufacturing apparatus is displayed on the display screen 20 and that an eyeglass manufacturing apparatus to be used is selected by switching the work screen. In this case, for example, an operator may operate (for example, a scrolling operation or a drag operation) a work screen of a predetermined eyeglass manufacturing apparatus displayed on the display unit 75, and thereby the control unit 70 may switch the work screen to a work screen of an immediately subsequent eyeglass manufacturing apparatus. More specifically, for example, the first work screen 22a of the subjective optometric apparatus 4 is displayed as a display screen, and an operator operates the first work screen 22a, and thereby the second work screen 22b of the lensmeter 2 is displayed as a display screen. An operator, for example, may display a desired work screen on the display unit 75 and select a setting switch not illustrated, and thereby the control unit 70 may set an eyeglass manufacturing apparatus corresponding to the work screen as an eyeglass manufacturing apparatus to be used. In addition, for example, an operator may display a desired work screen on the display unit 75, and the control unit 70 may set an eyeglass manufacturing apparatus corresponding to the displayed work screen as an eyeglass manufacturing apparatus to be used.

The control unit 70, for example, sets one eyeglass manufacturing apparatus according to a process from a plurality of eyeglass manufacturing apparatuses as an eyeglass manufacturing apparatus that assists operation of an eyeglass manufacturing apparatus corresponding to the selected operating region (S2). The control unit 70, for example, starts controlling the subjective optometric apparatus 4 in a case where the operating region 21a is selected.

The control unit 70, for example, causes the communicating unit 77 to send a booting signal to the subjective optometric apparatus 4 (the communicating unit 18 of the visual target presenting unit 13 and the communicating unit 19 of the refractor 15). A control unit of the subjective optometric apparatus 4 (the visual target presenting unit 13 and the refractor 15) not illustrated, for example, when receiving the booting signal from the terminal device 10, sends an instruction signal to display the work screen 22a of the subjective optometric apparatus 4 on the display unit 75 of the terminal device 10. The control unit 70 of the terminal device 10, when receiving the instruction signal from the control unit of the subjective optometric apparatus 4, reads the work screen 22a from the storage unit 74 and displays the work screen 22a on the display unit 75 (S3) (refer to FIG. 5). Apparently, a configuration in which a storage unit is disposed in each of the plurality of eyeglass manufacturing apparatuses 11 and store a work screen may be used. In this case, work screen data is sent from the plurality of eyeglass manufacturing apparatus 11 to the terminal device 10. In addition, a configuration in which a server (includes a storage unit) is separately provided, signals are sent from the terminal device 10 and at least any of the plurality of eyeglass manufacturing apparatuses 11, and work screen data is sent from the server to the terminal device 10 may be used.

An operator, for example, checks and operates the work screen 22a of the subjective optometric apparatus 4 on the display unit 75 of the terminal device 10. For example, providing operational input on the work screen 22a causes the control unit 70 to operate the subjective optometric apparatus 4 (S5). In this case, for example, the work screen 22a is used as an operating screen. The control unit 70, for example, causes the communicating unit 77 to send an operating signal input in the terminal device 10 to the subjective optometric apparatus 4. An operator, for example, performs a drag operation, a pinch operation, and the like on the work screen 22a, and thereby the visual target presented in the visual target presenting unit 13 and the optical element disposed in the examination window of the refractor 15 are changed.

An operator, for example, operates the display unit 75 of the terminal device 10 and thereby controls operation of the subjective optometric apparatus 4 and performs examination. When the examination is completed, the operator selects an examination completion switch not illustrated. When the examination completion switch not illustrated is selected, the control unit 70 stores a measurement result measured by subjective examination in the storage unit 74 (S6). Apparently, the measurement results of the plurality of eyeglass manufacturing apparatuses 11 may be configured to be sent and stored in a storage unit of other apparatuses.

Next, the control unit 70 again displays, on the display unit 75, the display screen 20 on which the plurality of operating regions 21 of the work screens corresponding to the plurality of eyeglass manufacturing apparatuses 11 is displayed (refer to FIG. 3). The control unit 70 may display a measurement result stored in the storage unit 74 in a partial region of the corresponding operating region 21 (for example, the operating region 21a in the case of the subjective optometric apparatus 4).

Figure 6:
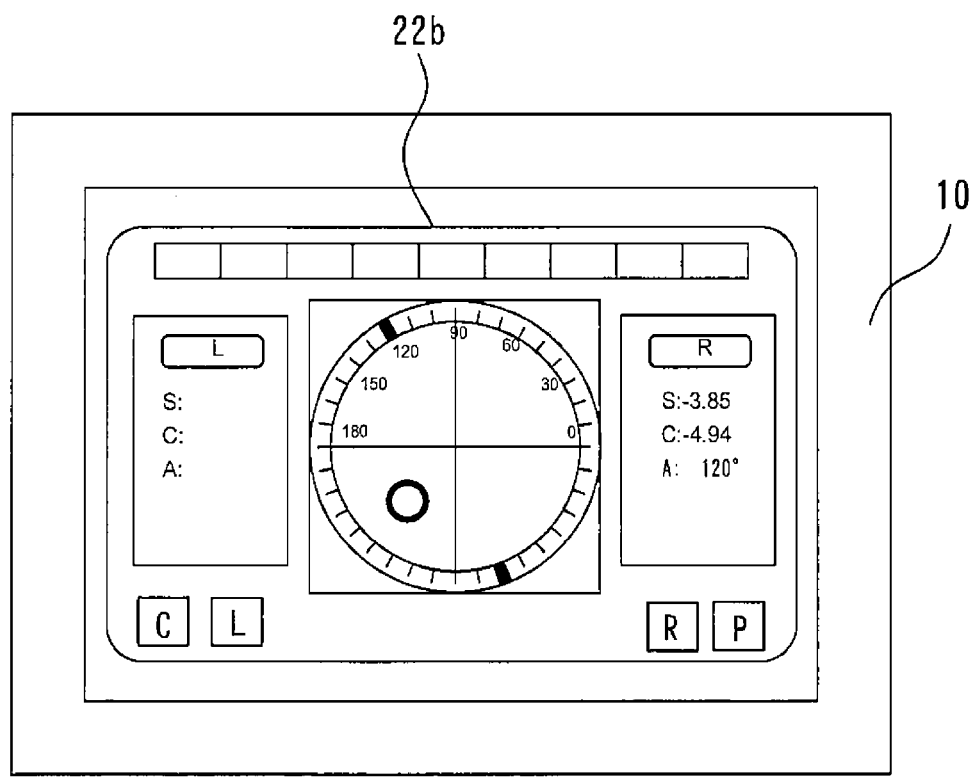
FIG. 6 is a diagram illustrating one example of a work screen of a lensmeter.
Figure 7:
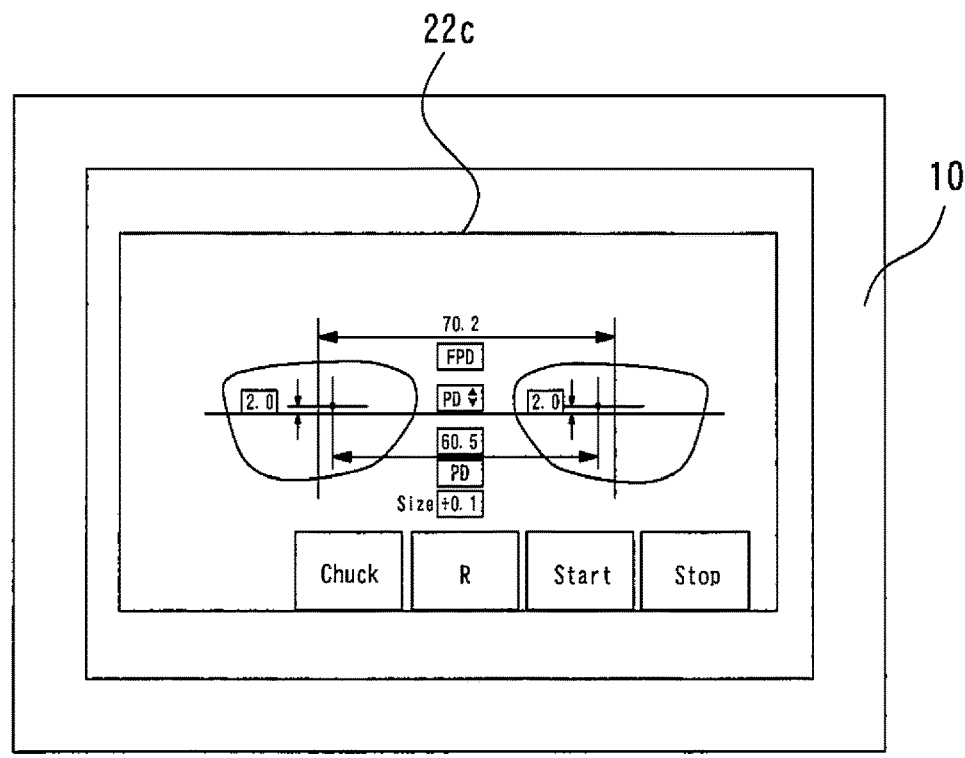
FIG. 7 is a diagram illustrating one example of a work screen of a blocker.
Figure 8:
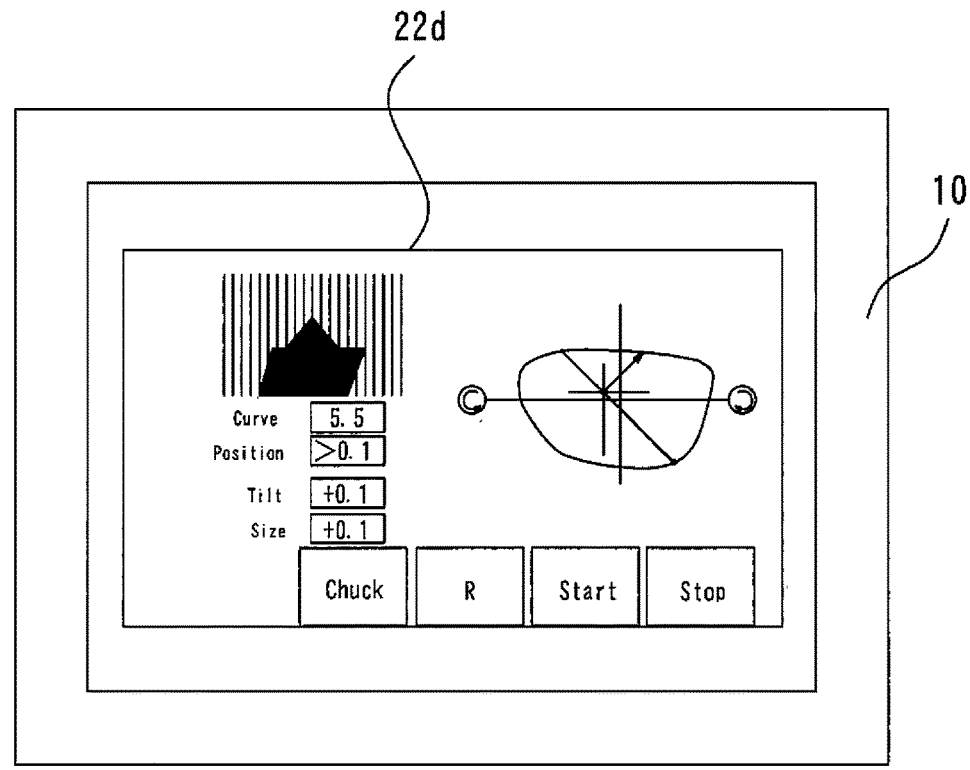
FIG. 8 is a diagram illustrating one example of a work screen of a lens edger.

Next, when the operator selects the operating region 21b of the work screen 22b of the lensmeter 2 that is used in an immediately subsequent eyeglass manufacturing process, the control unit 70 displays the work screen 22b of the lensmeter 2 on the display unit 75 (refer to FIG. 6). Apparently, the control unit 70 may be configured to automatically display a work screen of an eyeglass manufacturing apparatus that is used in an immediately subsequent process in eyeglass manufacturing processes.

The operator, for example, when the work screen 22b is displayed, checks operation of the lensmeter 2 during an operation on the work screen 22b and performs measurement. In this case, for example, the work screen 22b is used as an observation screen. The control unit 70, for example, causes the communicating unit 77 to receive an input signal input in the lensmeter 2. The operator, for example, performs an operation such as measuring an eyeglass lens in the lensmeter 2 while checking the work screen 22b. The control unit 70, for example, regularly sends, as an input signal from the lensmeter 2 to the terminal device 10, information during an operation that is input in the lensmeter 2 in a real-time manner. The information during an operation is exemplified by an alignment screen for the optical center of the eyeglass lens with respect to the measuring optical system of the lensmeter 2. Information that is input in a case where the operator provides various types of input in the lensmeter 2 may be sent to the terminal device 10. Such control causes the work screen 22b to be displayed on the display unit 75 of the terminal device 10 in a real-time manner.

The operator, for example, when measurement performed with the lensmeter 2 is completed, selects a measurement completion switch not illustrated. When the measurement completion switch not illustrated is selected, the control unit 70 stores a measurement result measured by the lensmeter 2 in the storage unit 74.

Next, the control unit 70 again displays, on the display unit 75, the display screen 20 on which the plurality of operating regions 21 of the work screens corresponding to the plurality of eyeglass manufacturing apparatuses 11 is displayed (refer to FIG. 3). When the operator selects the operating region 21c of the work screen 22c of the blocker 3 that is used in an immediately subsequent eyeglass manufacturing process, the control unit 70 displays the work screen 22c of the blocker 3 on the display unit 75 (refer to FIG. 7).

The tracer, not illustrated, that is disposed in the blocker 3, for example, measures the shape of an eyeglass frame, and traced outline data of the eyeglass frame is obtained. The traced outline data obtained, for example, is displayed on the work screen 22c. The operator, for example, checks the work screen 22c of the blocker 3 on the display unit 75 of the terminal device 10 and performs an operation such as setting various parameters. In addition, for example, the operator checks operation of the blocker 3 during an operation on the work screen 22c of the blocker 3 and performs adjustment for attaching a cup. In this case, for example, the work screen 22c is used as an operating screen and an observation screen. The control unit 70, for example, causes the communicating unit 77 to send an operating signal input in the terminal device 10 to the blocker 3. Information that is obtained in a process before the blocker 3 (for example, measurement results of the subjective optometric apparatus 4 and the lensmeter 2) may be automatically input into the blocker 3. Apparently, the operator may input the information that is obtained in a previous process.

Operation of the blocker 3 is controlled on the basis of, for example, information as to various parameters that are input by the operator on the work screen 22c. The operator places the eyeglass lens in the blocker 3 while checking the work screen 22c. When, for example, the operator operates a blocking switch not illustrated, the blocker 3 performs control to attach a cup to the eyeglass lens.

The control unit 70, for example, when attachment of the cup is completed, receives a completion signal that is sent from the blocker 3 to the terminal device 10. The control unit 70, for example, when receiving the completion signal, stores information such as various set parameters in the storage unit 74 in the blocker 3.

Next, the control unit 70 again displays, on the display unit 75, the display screen 20 on which the plurality of operating regions 21 of the work screens corresponding to the plurality of eyeglass manufacturing apparatuses 11 is displayed (refer to FIG. 3). When the operator selects the operating region 21d of the work screen 22d of the edger 5 that is used in an immediately subsequent eyeglass manufacturing process, the control unit 70 displays the work screen 22d of the edger 5 on the display unit 75 (refer to FIG. 8).

When the work screen 22d is displayed, the operator, for example, checks the work screen 22d on the display unit 75 of the terminal device 10 and performs an operation such as setting various parameters (for example, setting the material of the eyeglass lens and setting a finishing shape). In this case, for example, the work screen 22d is used as an operating screen. Operation of the edger 5 is controlled on the basis of, for example, information as to various parameters input by the operator on the work screen 22d and the traced outline data. The operator, for example, causes the eyeglass lens to be pinched in a lens chuck shaft of the edger 5. Next, when the operator operates the work screen 22d and operates a processing starting switch not illustrated, the periphery of the eyeglass lens is processed.

Figure 4:
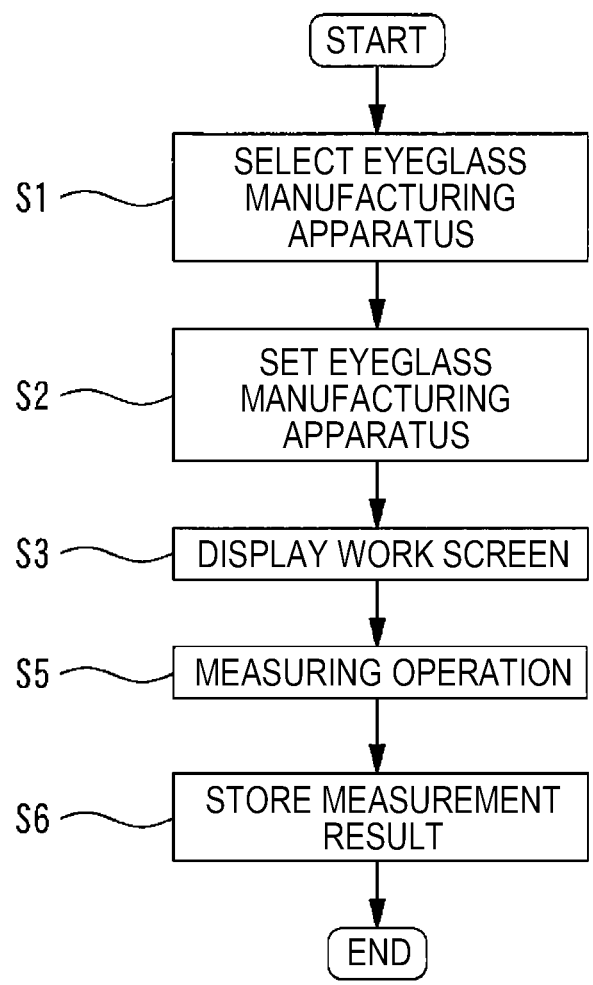
FIG. 4 is a flowchart illustrating operation of a plurality of eyeglass manufacturing apparatuses that uses the terminal device.
Figure 5:
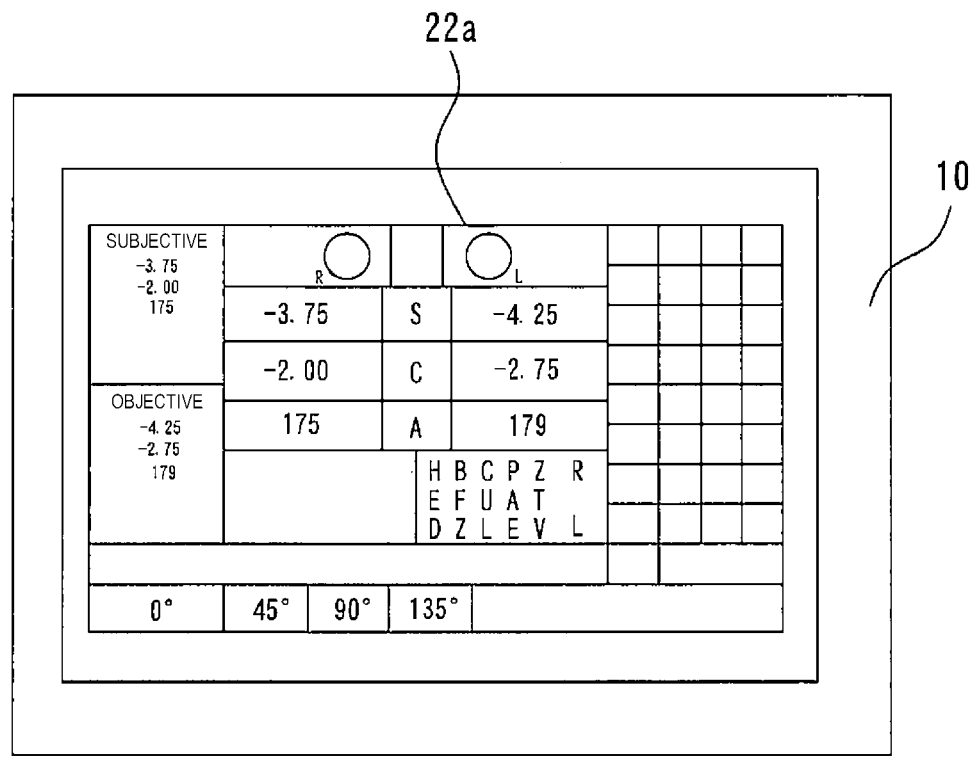
FIG. 5 is a diagram illustrating one example of a work screen of a subjective optometric apparatus.

As described heretofore, the operator, for example, repeatedly operates such apparatuses using the terminal device 10, and thereby operation of the flowchart illustrated in FIG. 4 is performed in the plurality of eyeglass manufacturing apparatuses 11. Accordingly, a measurement result can be obtained in each of the plurality of eyeglass manufacturing apparatuses 11 used in the eyeglass manufacturing processes, and eyeglasses can be manufactured.

In this manner, one terminal device can assist operation of a plurality of eyeglass manufacturing apparatuses, and eyeglasses can be efficiently manufactured. In addition, since the plurality of eyeglass manufacturing apparatuses 11 can be operated with one terminal device 10, the operator, for all eyeglass manufacturing apparatuses, is not required to be present near the eyeglass manufacturing apparatuses and can operate and observe the eyeglass manufacturing apparatuses from a separated position.

Since, for example, an operator can set an eyeglass manufacturing apparatus to be used while checking a work screen of each eyeglass manufacturing apparatus, the apparatus to be used can be easily recognized. In addition, for example, since work screens respectively corresponding to a plurality of eyeglass manufacturing apparatuses can be checked, an apparatus for which measurement, setting, and the like are not completed in eyeglass manufacturing can be easily recognized. In addition, for example, collectively storing work screens of a plurality of eyeglass manufacturing apparatuses used for manufacturing eyeglasses allows an operator inexperienced in eyeglass manufacturing to easily recognize an apparatus that is required to be used when eyeglasses are manufactured. Accordingly, eyeglasses can be smoothly manufactured.

The display state of a work screen, the state of an operation being performed on a work screen, whether or not to display a work screen, and the like may be changed in the present example according to whether or not the use of an eyeglass manufacturing apparatus is previously completed for the work screen. A configuration that determines whether or not an operation using an eyeglass manufacturing apparatus is completed in a work process is exemplified by a configuration that makes determination on the basis of, for example, whether or not a measurement result is stored in the storage unit 74.

The display state of a work screen is changed in order for an operator to recognize completion in a case where, for example, the use of an eyeglass manufacturing apparatus on the work screen is completed. A configuration that changes the display state is exemplified by a configuration that changes the color of the display screen (for example, a configuration that displays the display screen in gray), a configuration that displays a mark (label) on the display screen, and a configuration that changes the display size. For example, exemplified is a configuration that displays the operating region 21a (refer to FIG. 3) in gray in a case where, for example, measurement performed with the subjective optometric apparatus 4 is completed.

The state of an operation being performed on a work screen is changed in order for an operator to recognize completion in a case where, for example, the use of an eyeglass manufacturing apparatus on the work screen is completed. A configuration that changes the state of an operation being performed on a work screen is exemplified by a configuration that forbids input on a work screen by an operator and a configuration that restricts a part of input on a work screen by an operator. More specifically, for example, the control unit 70 may restrict sending of an operating signal to an eyeglass manufacturing apparatus from a work screen of an eyeglass manufacturing apparatus that is used in a work process subsequent to a work process in which work on a work screen of an eyeglass manufacturing apparatus (for example, a measuring operation) is not completed in manufacturing processes for eyeglasses. For example, operations on the work screen 22c of the blocker 3 and the work screen 22d of the edger 5 may be forbidden in a case where, for example, an operation is not completed for the lensmeter 2. The restriction may be released in a case where an operator performs a predetermined operation.

A configuration that controls whether or not to display a work screen in order for an operator to recognize completion in a case where, for example, the use of an eyeglass manufacturing apparatus on the work screen is completed is exemplified by a configuration that does not display a work screen of an eyeglass manufacturing apparatus of which the use is completed. For example, exemplified is a configuration that does not display the operating region 21a (refer to FIG. 3) in a case where, for example, measurement performed with the subjective optometric apparatus 4 is completed.

In this manner, providing a configuration that performs control of changing according to whether or not the use of an eyeglass manufacturing apparatus is completed for a work screen can prevent erroneous proceeding of a series of work processes when eyeglasses are manufactured. Accordingly, eyeglasses can be smoothly manufactured. In addition, since even an operator inexperienced in manufacturing of eyeglasses operates eyeglass manufacturing apparatuses in accordance with work screens displayed on the display, eyeglasses can be easily manufactured.

While a configuration that displays only a work screen of one eyeglass manufacturing apparatus and operates the eyeglass manufacturing apparatus in a case where an eyeglass manufacturing apparatus to be used is set is exemplified in the present example, the present disclosure is not limited thereto. For example, a plurality of eyeglass manufacturing apparatuses may be selected in order to perform different processes, and a plurality of work screens for the selected eyeglass manufacturing apparatuses may be displayed on the same screen.

The terminal device 10 may update various settings, software, and the like of the plurality of eyeglass manufacturing apparatuses 11 in the present example. The control unit 70, for example, may download setting information, update software, and the like of each eyeglass manufacturing apparatus 11 through an Internet line and may send the setting information, the update software, and the like to the plurality of eyeglass manufacturing apparatuses 11. The plurality of eyeglass manufacturing apparatuses 11 may cause an update program received from the terminal device 10 to update various settings, software, and the like.

Any image, for example, may be displayed as a background image along with the operating region 21 and the like in the present example. The control unit 70, for example, may superimpose the operating region 21 on a layout image in which walls of a room, boundaries, desks, and the like are drawn. Accordingly, an operator can easily recognize correspondence between the plurality of eyeglass manufacturing apparatuses 11 displayed on the display unit 75 and the plurality of eyeglass manufacturing apparatuses 11 in a room in which the eyeglass manufacturing processes are performed. Apparently, the control unit 70 may superimpose the operating region 21 on an image that is captured by a camera, not illustrated, disposed in the terminal device 10.

The plurality of eyeglass manufacturing apparatuses 11 may include a notifying unit. The notifying unit, for example, may indicate to an operator that operation will be started, or may notify an operator of operation, operating error, occurrence of malfunctioning, and the like in the plurality of eyeglass manufacturing apparatuses 11. For example, a display lamp or an audio output unit may be used as the notifying unit. The notifying unit, for example, may notify the process order of the eyeglass manufacturing processes. In this case, for example, a configuration that notifies an eyeglass manufacturing apparatus to be used with a display lamp or a configuration that provides guidance with an audio output unit may be used.

The terminal device 10 may transfer data and the like of the plurality of eyeglass manufacturing apparatuses 11 to an electronic medical record, a filing system, and the like or may cooperate with the electronic medical record, the filing system, and the like in the present example.

<Operation of Selecting from Eyeglass Manufacturing Apparatuses of Same Type>

Figure 9:
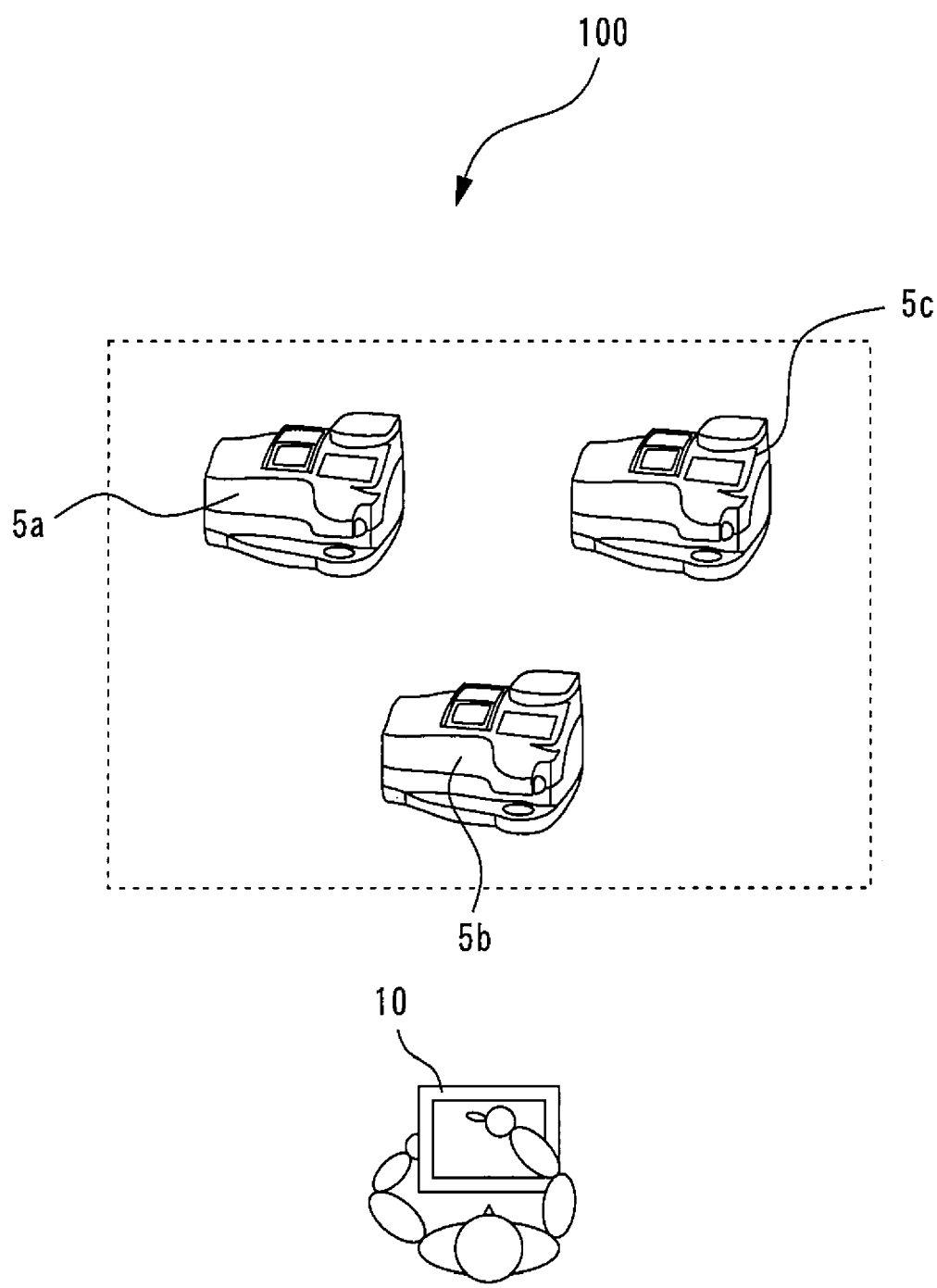
FIG. 9 is a diagram illustrating an eyeglass manufacturing system in which a plurality of eyeglass manufacturing apparatuses of the same type exists in a process of an eyeglass lens processing.

A configuration that selects an eyeglass manufacturing apparatus to be used may be provided in the present example in a case where there exists a plurality of eyeglass manufacturing apparatuses of the same type in a common process in the processes of manufacturing eyeglasses. Hereinafter, the configuration that selects an eyeglass manufacturing apparatus to be used in a case where there exists a plurality of eyeglass manufacturing apparatuses of the same type in a common process will be described. FIG. 9 is a diagram illustrating an eyeglass manufacturing system in which there exists a plurality of eyeglass manufacturing apparatuses of the same type in an eyeglass lens processing process. A case where there exists a plurality of the edgers 5 will be exemplified in the present example. Apparently, the technology of the present disclosure can be applied to other eyeglass manufacturing apparatuses as well.

Eyeglass manufacturing apparatuses of the same type in the present example are not limited to eyeglass manufacturing apparatuses that have completely the same configuration (eyeglass manufacturing apparatuses of the same model). Any eyeglass manufacturing apparatuses that have at least a function for performing the same process may be used. For example, eyeglass manufacturing apparatuses of the same type may be eyeglass manufacturing apparatuses of different versions or may be eyeglass manufacturing apparatuses in which a partial configuration is added or removed.

An eyeglass lens processing system 100 illustrated in FIG. 9, for example, includes a first edger 5a, a second edger 5b, a third edger 5c, and the terminal device 10. While a configuration that includes three edgers is exemplified in the present example, the present disclosure is not limited thereto. The technology of the present disclosure can be applied to any configuration that includes a plurality of edgers.

An operator, for example, in a case where there exists three edgers 5a, 5b, and 5c in an eyeglass lens processing process, selects an edger to be used in the processing process from the three edgers 5a, 5b, and 5c. At this point, for example, the control unit 70 obtains each of the edgers 5a, 5b, and 5c. The control unit 70, for example, displays standby information obtained for each of the edgers 5a, 5b, and 5c on the display unit 75 of the terminal device 10.

The control unit 70, for example, as a configuration that obtains the standby information, receives the standby information sent from each of the edgers 5a, 5b, and 5c and thereby obtains the standby information. More specifically, a configuration that obtains the standby information, for example, may obtain the standby information by communication from the terminal device 10 to each of the edgers 5a, 5b, and 5c. In this case, for example, the control unit 70 may cause the communicating unit 77 to send, to each of the edgers 5a, 5b, and 5c, a standby information obtaining signal for causing each of the edgers 5a, 5b, and 5c to send the standby information. Each of the edgers 5a, 5b, and 5c (a communicating unit of each edger), when receiving the standby information obtaining signal, sends the standby information to the terminal device 10. The control unit 70 causes the communicating unit 77 to receive the standby information sent from each of the edgers 5a, 5b, and 5c. A configuration that sends the standby information obtaining signal from the terminal device 10 may be, for example, a configuration in which the standby information obtaining signal is sent by an operator operating the terminal device 10, a configuration that automatically sends the standby information obtaining signal on the basis of a preset condition (for example, the terminal device 10 and each eyeglass manufacturing apparatus are in a distance less than or equal to a preset distance), or a configuration that sends the standby information obtaining signal at all times or at a certain timing. Apparently, the condition may be set to any condition by an operator.

More specifically, a configuration that obtains the standby information, for example, may obtain the standby information by communication from each of the edgers 5a, 5b, and 5c to the terminal device 10. In this case, for example, each of the edgers 5a, 5b, and 5c (a control unit of each edger not illustrated) may cause the communicating unit of each edger to send the standby information to the terminal device 10 on the basis of a preset condition (for example, the terminal device 10 and each eyeglass manufacturing apparatus are in a distance less than or equal to a preset distance). In addition, for example, each of the edgers 5a, 5b, and 5c may send the standby information from the communicating unit of each of the edgers 5a, 5b, and 5c at all times or at a certain timing. The control unit 70 causes the communicating unit 77 to receive the standby information sent from each of the edgers 5a, 5b, and 5c. At this point, the control unit 70 in the terminal device 10 may provide display on the display unit 75 to allow an operator to choose whether or not to permit reception of the standby information.

The control unit 70, for example, as the standby information, displays information that indicates whether or not each of the edgers 5a, 5b, and 5c is in an available state. The information, in a case where, for example, each of the edgers 5a, 5b, and 5c is in a standby state, indicates that each of the edgers 5a, 5b, and 5c can be immediately used. The information, in a case where, for example, each of the edgers 5a, 5b, and 5c is not in a standby state, indicates a state where each of the edgers 5a, 5b, and 5c cannot be immediately used. A case where, for example, each of the edgers 5a, 5b, and 5c is in an unavailable state is exemplified by a case where each of the edgers 5a, 5b, and 5c is previously being used, a case where each of the edgers 5a, 5b, and 5c is powered down, and a case where each of the edgers 5a, 5b, and 5c fails to function. The standby information, for example, is obtained by the control unit of each of the edgers 5a, 5b, and 5c not illustrated, and the control unit of each of the edgers 5a, 5b, and 5c not illustrated, for example, obtains the standby information on the basis as to whether or not an edger is being driven.

While a case where the standby information is sent from each of the edgers 5a, 5b, and 5c is exemplified in the present example, the present disclosure is not limited thereto. The standby information may be configured to be obtained by the terminal device 10. For example, the terminal device 10 may determine each of the edgers 5a, 5b, and 5c not to be in an available state in a case where the standby information cannot be received from each of the edgers 5a, 5b, and 5c (for example, in a case where an edger is powered OFF), and may use determined information as the standby information.

The control unit 70, for example, uses the standby information from each of the edgers 5a, 5b, and 5c to display the standby information of each of the edgers 5a, 5b, and 5c on the display unit 75. An operator checks the standby information and thereby selects an edger to be used. When the operator selects an edger, the control unit 70 sets the selected edger as an eyeglass manufacturing apparatus of which the operation is assisted. At least one eyeglass manufacturing apparatus can be set as the set eyeglass manufacturing apparatus. While a configuration in which an operation by an operator sets an edger of which the operation is assisted is exemplified in the present example, the present disclosure is not limited thereto. For example, any configuration in which the control unit 70 sets one eyeglass manufacturing apparatus from each of the edgers 5a, 5b, and 5c on the basis of the standby information as an edger of which the operation is assisted may be used. For example, the control unit 70, for example, may automatically set an edger of which the operation is assisted, from each of the edgers 5a, 5b, and 5c on the basis of the standby information.

The control unit 70 in the present example, in a case where two or more edgers of the edgers 5a, 5b, and 5c are in a standby state (a state where an edger can be immediately used), may set an eyeglass manufacturing apparatus of which the operation is assisted, on the basis of a preset condition. For example, a configuration in which each of the edgers 5a, 5b, and 5c is set in an order of registration may be used. In addition, for example, a configuration in which each of the edgers 5a, 5b, and 5c is set in an order of new versions (for example, the first edger 5a is prioritized in a case where the first edger 5a is the latest version) may be used.

In this manner, selecting an eyeglass manufacturing apparatus to be used from a plurality of eyeglass manufacturing apparatuses on the basis of a standby state in a case where there exists a plurality of eyeglass manufacturing apparatuses of the same type allows an available eyeglass manufacturing apparatus to be easily selected from a plurality of eyeglass manufacturing apparatuses of the same type. Accordingly, an eyeglass manufacturing apparatus can be smoothly used.

While a case where there exists a plurality of eyeglass manufacturing apparatuses in one process is exemplified in the present example, the present disclosure is not limited thereto. For example, at least one eyeglass manufacturing apparatus may be set in each process in which a plurality of eyeglass manufacturing apparatuses exists, in a case where there exists a plurality of eyeglass manufacturing apparatuses in a plurality of processes (two or more processes) for manufacturing eyeglasses. More specifically, for example, a configuration that detects information as to whether or not there exists a plurality of eyeglass manufacturing apparatuses of the same type in each process may be provided. Obtaining of the standby information described above and control of selection may be performed in a case where there exists a plurality of eyeglass manufacturing apparatuses. A configuration that detects information as to whether or not there exists a plurality of eyeglass manufacturing apparatuses is exemplified by a configuration in which a determining unit that determines whether or not there exists a plurality of eyeglass manufacturing apparatuses is provided in each process for manufacturing eyeglasses. In this case, for example, the determining unit (for example, the control unit 70) may make determination in each process by receiving the number of signals transmitted from an eyeglass manufacturing apparatus for each process. In addition, a configuration that detects information as to whether or not there exists a plurality of eyeglass manufacturing apparatuses of the same type is exemplified by a configuration that obtains registration (setting) information for an eyeglass manufacturing apparatus possessed by an operator in advance. In this manner, an available eyeglass manufacturing apparatuses can be easily selected in each work process in a case where there exists a plurality of eyeglass manufacturing apparatuses in any work process of each work process for manufacturing eyeglasses. Accordingly, eyeglasses can be smoothly manufactured.

Description will be provided more specifically. The standby information is obtained in each process in a case where, for example, there exists a plurality of eyeglass manufacturing apparatuses in each of all eyeglass manufacturing processes, and at least one eyeglass manufacturing apparatus is set in each process. The control unit 70, for example, detects whether or not there exists a plurality of eyeglass manufacturing apparatuses of the same type in each work process when eyeglasses are manufactured, and obtains the standby information for the plurality of eyeglass manufacturing apparatuses of the same type in a work process in which existence of a plurality of eyeglass manufacturing apparatuses of the same type is detected. The control unit 70, for example, on the basis of the standby information, sets at least one eyeglass manufacturing apparatus as an eyeglass manufacturing apparatus of which the operation is assisted, in each work process when eyeglasses are manufactured. Since, in this manner, an eyeglass manufacturing apparatus to be used is set in each work process of manufacturing eyeglasses, operation of each eyeglass manufacturing apparatus can be assisted by one terminal device, and each work process can be smoothly performed. Accordingly, eyeglasses can be more smoothly manufactured.

The control unit 70, for example, displays, on the screen of the display unit 75 of the terminal device 10, a work screen that assists operation of the set eyeglass manufacturing apparatus. In this manner, displaying a work screen allows operation of a plurality of eyeglass manufacturing apparatuses to be assisted by one terminal device 10 and allows an eyeglass manufacturing apparatus to be smoothly used.

<Handover Function in Work Process>

Figure 10:
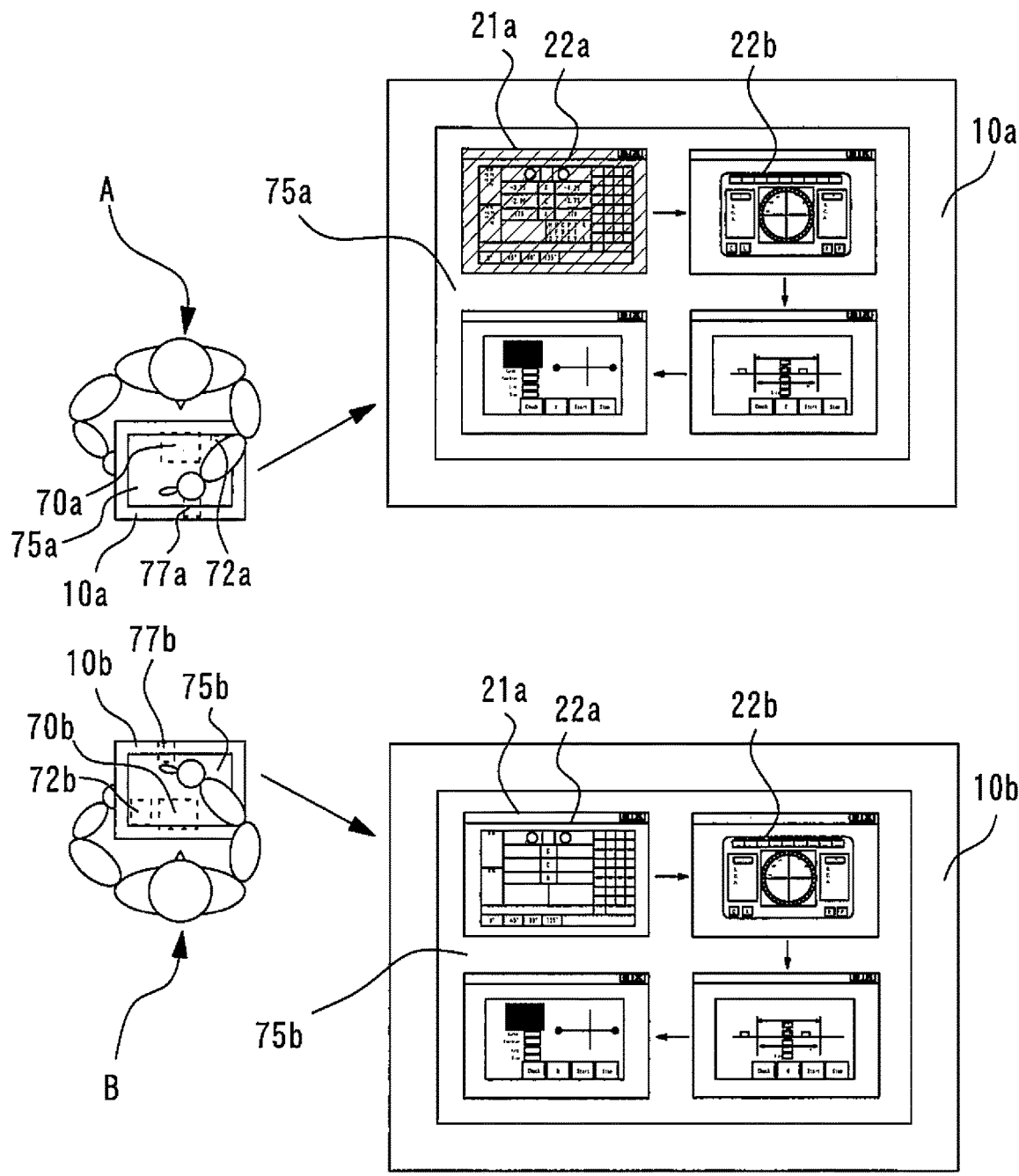
FIG. 10 is a diagram illustrating a handover operation between terminal devices.

A configuration in which, for example, the terminal device 10 can perform a handover at a point midway of eyeglass manufacturing processes may be provided in the present example. FIG. 10 is a diagram illustrating a handover operation between terminal devices.

A case where, for example, work data is handed over from a terminal device 10a of an operator A to a terminal device 10b of an operator B will be exemplified. For example, the operator A uses a plurality of eyeglass manufacturing apparatuses and performs eyeglass manufacturing processes before performing a handover. The operator A, for example, uses a plurality of eyeglass manufacturing apparatuses by using the terminal device 10a and performs eyeglass manufacturing processes. A control unit 70a of the terminal device 10a, for example, reads a work screen from a storage unit 74a that stores a plurality of work screens and the order of the plurality of work screens, and displays the work screen on a display unit 75a of the terminal device 10a. The operator A uses the plurality of work screens of the plurality of eyeglass manufacturing apparatuses to perform an operation using the plurality of eyeglass manufacturing apparatuses.

FIG. 10 illustrates, for example, a state where the operator A completes measurement performed with the subjective optometric apparatus 4. A display unit of the terminal device 10a used by the operator A, for example, displays each of the operating regions 21a to 21d. Since, for example, measurement performed with the work screen 22b of the subjective optometric apparatus 4 is completed, the operating region 21a (the work screen 22a) displays completion of measurement (displays hatching in the present example). That is, work performed by the operator A is in a state where only a measurement process performed with the subjective optometric apparatus 4 is completed.

Work data, for example, is sent from the terminal device 10a to the terminal device 10b in a case where a handover is performed to the operator B. Apparently, work data may be configured to be sent to the terminal device 10b through other apparatuses (for example, an eyeglass manufacturing apparatus, a server, and a PC).

The operator A, for example, selects a terminal switching switch (handover switch) of the terminal device 10a not illustrated. When the terminal switching switch not illustrated is selected, a switching unit (for example, the control unit 70a) transmits (sends) a switch signal that switches a terminal device for assisting operation of a plurality of eyeglass manufacturing apparatuses to another terminal device. The control unit 70a, in a case where the switch signal is received, causes the communicating unit 77 to send, to the terminal device 10b, work data that is obtained until reception of the switch signal through an operation performed by an operator on a work screen displayed on the display unit 75a. The work data that is obtained until reception of the switch signal through an operation performed by an operator on a work screen displayed on the display includes, for example, information as to completion of an operation performed by an operator on a plurality of work screens of each of a plurality of eyeglass manufacturing apparatuses.

While a configuration in which the control unit 70a of the terminal device 10a sends and receives the switch signal is exemplified in the present example, the present disclosure is not limited thereto. For example, a sending unit and a receiving unit for the switch signal may be separately provided. While a configuration in which the switch signal is sent by an operator operating the terminal switching switch is exemplified in the present example, the present disclosure is not limited thereto. For example, the switch signal may be sent in a case where the distance between the terminal device 10a and the terminal device 10b becomes equal to a present distance. In addition, a configuration that sends the switch signal is exemplified by a configuration in which the switch signal is transmitted from the terminal switching switch that is disposed in another apparatus different from the terminal device 10a (for example, an eyeglass manufacturing apparatus, a server, or a PC). In this case, for example, the switch signal may be sent by an operator selecting the switching switch disposed in another apparatus.

A control unit 70b of the terminal device 10b, for example, displays a work screen based on work data on a display unit 75b in a case where a communicating unit 77b receives work data sent from the terminal device 10a. More specifically, for example, the control unit 70b reads a work screen from a storage unit 74b that stores a plurality of work screens and the order of the plurality of work screens. The control unit 70b reflects the work data received from the terminal device 10a on the read work screen and updates the work screen. The control unit 70b displays the updated work screen on the display unit 75b. While a configuration that hands a screen over in the present example is exemplified by a configuration that reflects the work data received from the terminal device 10a on the work screen read from the storage unit 74b and updates the work screen, the present disclosure is not limited thereto. For example, the terminal device 10b may store the work data received from the terminal device 10a in the storage unit 74b and display the received work data on the display unit 75b.

A display screen, for example, that includes the same work screen as the display unit 75a of the terminal device 10a is displayed on the display unit 75b of the terminal device 10b. A display screen 20b of the terminal device 10b before a handover process is performed, for example, is updated to the same display screen as a display screen 20a of the terminal device 10a after the handover process as illustrated in FIG. 10. The operating region 21a of the display screen 20b, for example, is updated to a state where completion of measurement is displayed. That is, the operating region 21a of the terminal device 10b is displayed in a hatched manner, and the work screen 22a is displayed in a state where a measurement result is input. A measurement result measured by the subjective optometric apparatus 4 by using the work screen 22a of the terminal device 10a is stored in the storage unit 74b of the terminal device 10b as a measurement result that is measured by the subjective optometric apparatus 4 by using the work screen 22a of the operating region 21a of the terminal device 10b.

The operator B checks the updated display screen 20b of the terminal device 10b, and the work in the eyeglass manufacturing processes is handed over to the operator B. Such a configuration allows a work process that is handed over to be easily recognized even in a case of handing work over to a different operator at a point midway of eyeglass manufacturing processes, and thus a work process can be smoothly handed over. In addition, the operator to which a work process is handed over can easily recognize a work process in which work is to be resumed. Accordingly, the problem of resuming work in an erroneous work process can be prevented, and a handover can be favorably performed.

While a configuration in which the display screen 20b on which a work screen of each process is displayed is displayed after a handover is used in the present example, the present disclosure is not limited thereto. For example, a work screen of a process in which work is resumed may be displayed after a handover. In this case, for example, the work screen 22b for using the lensmeter 2 may be displayed. Description will be provided more specifically. The control unit 70b, for example, in a case where the communicating unit 77b receives work data sent from the terminal device 10a, displays, of a plurality of work screens, a work screen of a process subsequent to a work screen on which an operation is completed, on the display unit 75b on the basis of the work data. The control unit 70b in the present example, for example, displays, on the display unit 75b, the work screen 22b of a process subsequent to the work screen 22a on which an operation is completed. While a configuration in which the work screen 22b of a process, in a series of eyeglass manufacturing processes, that is immediately subsequent to a process corresponding to the work screen 22a on which an operation is completed is displayed as a subsequent process is exemplified in the present example, the present disclosure is not limited thereto. For example, a subsequent process may be a process, in a series of eyeglass manufacturing processes, that is after a process corresponding to a work screen on which an operation is completed (for example, a process using the work screen 22c and a process using the work screen 22d). In this manner, displaying a work screen of a process subsequent to a completed process allows easy recognition of a work process to which work is completed in a case where work is handed over, and can prevent a previously completed work process from being erroneously performed again. Accordingly, eyeglasses can be smoothly manufactured.

While a configuration in which the display screen 20b on which a work screen of each process is displayed is displayed after a handover is used in the present example, the present disclosure is not limited thereto. For example, a work screen on which work is completed may be displayed. In this case, for example, the work screen 22a for using the subjective optometric apparatus 4 may be displayed.

While a case where work data includes information as to completion of an operation by an operator on a plurality of work screens of each of a plurality of eyeglass manufacturing apparatuses is exemplified in the present example, the present disclosure is not limited thereto. For example, work data may be configured to include information as to a point midway of an operation that is performed by an operator on a work screen of one eyeglass manufacturing apparatus of a plurality of work screens. The information as to a point midway of an operation is exemplified by a measurement result that is measured until a point midway of an operation, a work screen during an operation, and the like. In this case, for example, the control unit 70b, in a case where the communicating unit 77b receives work data sent from the terminal device 10a, displays the state in an operation performed on a work screen of one eyeglass manufacturing apparatus, on the display unit 75b on the basis of the work data. Apparently, the state in an operation may be displayed on a work screen, among a plurality of work screens, during an operation in the display screen 20b which includes a plurality of work screens. In this manner, a handover can be easily performed to another operator even in a case where a handover is performed at a point midway of assisting an eyeglass manufacturing apparatus in one process. For example, an immediately subsequent operator is not required to restart operation of an eyeglass manufacturing apparatus and can smoothly manufacture eyeglasses.

Furthermore, a configuration that measures elapsed time from the start timing of an operation performed by an operator on a work screen displayed on the display unit 75a of the terminal device 10a may be disposed in the terminal device 10a in the present example. The control unit 70a, for example, measures elapsed time from the start timing of an operation performed by an operator on a work screen displayed on the display of the terminal device. The control unit 70a, for example, displays the measured elapsed time on the display unit 75a. Since, in this manner, an operator who performs a handover to a different operator and an operator to which work is handed over at a point midway of eyeglass manufacturing work processes can check time from the start of eyeglass manufacturing, a delay in eyeglass manufacturing and the like can be recognized, and a subsequent action such as prioritizing work in order to recover the delay can be taken considering the time until completion of eyeglass manufacturing.

What is claimed is:

1. A terminal device for assisting operation of a plurality of eyeglass manufacturing apparatuses which are used for performing different work processes in manufacturing eyeglasses, the terminal device comprising:
   a communication interface configured to communicate with the plurality of eyeglass manufacturing apparatuses;
   a processor;
   a display;
   a storage for storing a plurality of work screens assisting an operation performed by an operator for each of the plurality of eyeglass manufacturing apparatuses; and
   a memory that stores computer readable instructions, which when executed by the processor, cause the terminal device to execute:
   a setting instruction that sets, according to a work process selected from a plurality of work processes for manufacturing eyeglasses, a specific eyeglass manufacturing apparatus from the plurality of eyeglass manufacturing apparatuses as an eyeglass manufacturing apparatus of which the operation is assisted;
a controlling instruction that controls the communication interface to transmit an operating signal input in the terminal device to the specific eyeglass manufacturing apparatus set by the setting instruction or controls the communication interface to receive an input signal input in the specific eyeglass manufacturing apparatus set by the setting instruction;
a display control instruction for reading the plurality of work screens from the storage and displaying the plurality of work screens on a screen of the display; and
a selecting instruction for selecting the work screen of at least one eyeglass manufacturing apparatus from the plurality of work screens displayed on the display;
wherein the setting instruction sets the specific eyeglass manufacturing apparatus on the basis of the work screen of selected by selecting instruction from the plurality of work screens displayed on the display.

2. The terminal device according to claim 1,
wherein the storage stores the plurality of work screens for the plurality of eyeglass manufacturing apparatuses used in the processes until manufacturing of eyeglasses.

3. The terminal device according to claim 1,
wherein the storage stores the plurality of work screens and a screen order of the plurality of work screens that are set in such a manner that an order of use of the plurality of eyeglass manufacturing apparatuses is set to a manufacturing order used when eyeglasses are manufactured, and
the display control instruction displays the plurality of work screens on the screen of the display in the screen order.

4. The terminal device according to claim 3,
wherein, in the processes of manufacturing the eyeglasses, the controlling instruction restricts sending of the operating signal to the eyeglass manufacturing apparatus from the work screen that is used in the work process subsequent to the work process which is not completed.

5. The terminal device according to claim 2, wherein the computer readable instructions when executed by the processor causes the terminal device to execute a changing instruction for changing a work screen.

6. The terminal device according to claim 1,
wherein the work screen is at least one of an operation screen during operation of the eyeglass manufacturing apparatus and a screen on which an operation is performed by an operator and that is used for operating the eyeglass manufacturing apparatus and for sending the operating signal based on the performed operation to the eyeglass manufacturing apparatus.

7. A terminal device for assisting operation of a plurality of eyeglass manufacturing apparatuses which are used for performing different work processes in manufacturing eyeglasses, the terminal device comprising:
a communication interface configured to communicate with the plurality of eyeglass manufacturing apparatuses;
a processor; and
a memory that stores computer readable instructions, which when executed by the processor, cause the terminal device to execute:
a setting instruction that sets, according to a work process selected from a plurality of work processes for manufacturing eyeglasses, a specific eyeglass manufacturing apparatus from the plurality of eyeglass manufacturing apparatuses as an eyeglass manufacturing apparatus of which the operation is assisted;
a controlling instruction that controls the communication interface to transmit an operating signal input in the terminal device to the specific eyeglass manufacturing apparatus set by the setting instruction or controls the communication interface to receive an input signal input in the specific eyeglass manufacturing apparatus set by the setting instruction; and
an obtaining instruction for obtaining standby information of the plurality of eyeglass manufacturing apparatuses of the same type which are used for performing a common process in the processes of manufacturing eyeglasses;
wherein the communication interface communicates with the plurality of eyeglass manufacturing apparatuses of the same type; and
wherein the setting instruction sets at least one eyeglass manufacturing apparatus from the plurality of eyeglass manufacturing apparatuses of the same type as the eyeglass manufacturing apparatus of which the operation is assisted on the basis of the standby information of the obtaining instruction.

8. The terminal device according to claim 7,
wherein the obtaining instruction obtains the standby information of the plurality of eyeglass manufacturing apparatuses of the same type in a case where the plurality of eyeglass manufacturing apparatuses of the same type in at least any work process of each work process when eyeglasses are manufactured exist.

9. A terminal device for assisting operation of a plurality of eyeglass manufacturing apparatuses which are used for performing different work processes in manufacturing eyeglasses, the terminal device comprising:
a communication interface configured to communicate with the plurality of eyeglass manufacturing apparatuses;
a processor;
a storage for storing a plurality of work screens assisting an operation performed by an operator for each of the plurality of eyeglass manufacturing apparatuses and storing a screen order of the plurality of work screens which are set in such a manner that an order of use of the plurality of eyeglass manufacturing apparatuses is set to a manufacturing order used when eyeglasses are manufactured, and
a memory that stores computer readable instructions, which when executed by the processor, cause the terminal device to execute:
a setting instruction that sets, according to a work process selected from a plurality of work processes for manufacturing eyeglasses, a specific eyeglass manufacturing apparatus from the plurality of eyeglass manufacturing apparatuses as an eyeglass manufacturing apparatus of which the operation is assisted;
a controlling instruction that controls the communication interface to transmit an operating signal input in the terminal device to the specific eyeglass manufacturing apparatus set by the setting instruction or controls the communication interface to receive an input signal input in the specific eyeglass manufacturing apparatus set by the setting instruction;
a display controlling instruction for reading the work screen from the storage, and displaying the read work screen on a display of the terminal device, and wherein, in a case where the communication interface receives a switch signal for switching the terminal device used for assisting the operation of the plurality of eyeglass manufacturing apparatuses to another terminal device, the controlling instruction controls the communication interface to send, to said another terminal device, work data that is obtained until reception of the switch signal through an operation performed by an operator on the work screen displayed on the display, and controls the communication interface to receive the work data sent from said another terminal device, and wherein the display control instruction, in a case where the communication interface receives the work data sent from said another terminal device, displays the work screen on the display based on the work data.

10. The terminal device according to claim 9, wherein the work data includes information as to completion of the operation performed by the operator on the plurality of work screens for each of the plurality of eyeglass manufacturing apparatuses, and the display control instruction, in a case where the communication interface receives the work data sent from said another terminal device, displays, on the display, the work screen for a process subsequent to the work screen on which the operation is completed on the basis of the work data.

11. The terminal device according to claim 9, wherein the work data includes information as to a point midway of the operation performed by the operator on the work screen of the one eyeglass manufacturing apparatus, and the display control instruction, in a case where the communication interface receives the work data sent from said another terminal device, displays, on the display, a state at the point midway of the operation performed on the work screen of the one eyeglass manufacturing apparatus on the basis of the work data.

12. A terminal device that assists operation of a plurality of eyeglass manufacturing apparatuses which is used for performing different processes in processes of manufacturing eyeglasses, the device comprising:

a communication interface configured to communicate with the plurality of eyeglass manufacturing apparatuses;

a storage that stores a first work screen assisting an operation performed by an operator for an optometric apparatus configured to measure a visual function of both eyes of an examinee, a second work screen assisting an operation performed by the operator for a lensmeter configured to measure an optical characteristic of an eyeglass lens, a third work screen assisting an operation performed by the operator for a cup attaching apparatus for attaching a cup of a work jig to a surface of the eyeglass lens, and a fourth work screen assisting an operation performed by the operator for a lens processing apparatus which includes a processing tool processing the periphery of the eyeglass lens held in a lens chuck shaft, in an order of the first work screen, the second work screen, the third work screen, and the fourth work screen;

a processor; and a memory that stores computer readable instructions, which when executed by the processor, cause the terminal device to execute:

a display controlling instruction that displays the first work screen, the second work screen, the third work screen, and the fourth work screen in this order on a screen of a display of the terminal device;

a selecting instruction that selects the work screen from the first work screen, the second work screen, the third work screen, and the fourth work screen displayed by the display control instruction;

a setting instruction that sets one eyeglass manufacturing apparatus from the plurality of eyeglass manufacturing apparatuses as an eyeglass manufacturing apparatus of which the operation is assisted, on the basis of the work screen selected by the selecting instruction; and a controlling instruction that controls the communication interface to transmit an operating signal for an operation performed on the work screen selected by the selecting instruction to the eyeglass manufacturing apparatus set by the setting instruction.

13. A non-transitory computer readable recording medium storing computer readable instructions for controlling a terminal device used for assisting operation of a plurality of eyeglass manufacturing apparatuses used for performing different work processes in processes of manufacturing eyeglasses, the computer readable instructions when executed by a terminal device causing the terminal device to execute:

a setting instruction that sets, according to a work process selected from a plurality of work processes for manufacturing eyeglasses, one eyeglass manufacturing apparatus from the plurality of eyeglass manufacturing apparatuses as an eyeglass manufacturing apparatus of which the operation is assisted;

a control instruction that controls a communication interface configured to communicate with the plurality of eyeglass manufacturing apparatuses to transmit an operating signal for an operation performed for the terminal device to the eyeglass manufacturing apparatus set by the setting instruction, or controls the communication interface to receive an operating signal for an operation performed for the eyeglass manufacturing apparatus set by the setting instruction;

a display control instruction for reading the plurality of work screens from a storage and displaying the plurality of work screens on a screen of a display; and a selecting instruction for selecting the work screen of at least one eyeglass manufacturing apparatus from the plurality of work screens displayed on the display, wherein the setting instruction sets the specific eyeglass manufacturing apparatus on the basis of the work screen of selected by selecting instruction from the plurality of work screens displayed on the display.

* * * * *